US005865457A

United States Patent [19]

Knabusch et al.

[11] Patent Number: 5,865,457

[45] Date of Patent: Feb. 2, 1999

[54] WHEELED HEALTH CARE CHAIR

[75] Inventors: Charles T. Knabusch, Monroe; Larry P. LaPointe, Temperance; William D. Lipford, Monroe, all of Mich.

[73] Assignee: La-Z-Boy Incorporated, Monroe, Mich.

[21] Appl. No.: 892,048

[22] Filed: Jul. 14, 1997

Related U.S. Application Data

[63] Continuation-in-part of Ser. No. 781,509, Jan. 8, 1997, abandoned.

[51] Int. Cl.[6] ........ B62M 1/14

[52] U.S. Cl. ........ 280/304.1; 297/85; 297/325; 297/354.13

[58] Field of Search ........ 280/250.1, 304.1; 297/75, 83–84, 85, 86, 90, 91, 325, 326, 354.13

[56] References Cited

U.S. PATENT DOCUMENTS

| | | | |
|---|---|---|---|
| 597,878 | 1/1898 | Crandall . | |
| 617,058 | 1/1899 | Streng . | |
| 1,650,826 | 11/1927 | Fargo . | |
| 1,984,311 | 12/1934 | Lamar et al. . | |
| 2,377,649 | 6/1945 | Quinney . | |
| 2,383,340 | 8/1945 | Pezzano . | |
| 2,587,068 | 2/1952 | Sanders . | |
| 2,694,437 | 11/1954 | Glaser . | |
| 3,140,119 | 7/1964 | Offner . | |
| 3,147,039 | 9/1964 | Smith et al. . | |
| 3,191,990 | 6/1965 | Rugg et al. . | |
| 3,244,453 | 4/1966 | Fox . | |
| 3,269,769 | 8/1966 | Mizelle | 297/85 |
| 3,709,556 | 1/1973 | Allard et al. . | |
| 3,848,883 | 11/1974 | Breacain | 280/5.32 |
| 3,936,893 | 2/1976 | Anderson et al. . | |
| 4,079,990 | 3/1978 | McMunn et al. . | |
| 4,125,269 | 11/1978 | Kiel . | |
| 4,285,541 | 8/1981 | Onishi . | |
| 4,326,732 | 4/1982 | Gall et al. . | |
| 4,339,013 | 7/1982 | Weigt . | |
| 4,343,482 | 8/1982 | Wegner . | |
| 4,415,202 | 11/1983 | Pew . | |
| 4,691,962 | 9/1987 | Holdt . | |
| 4,754,987 | 7/1988 | Williams | 280/304.1 |
| 4,966,379 | 10/1990 | Mulholland | 280/250.1 |
| 4,974,905 | 12/1990 | Davis . | |
| 4,997,200 | 3/1991 | Earis . | |
| 5,156,226 | 10/1992 | Boyer et al. . | |
| 5,288,126 | 2/1994 | Saul et al. | 297/85 |
| 5,297,021 | 3/1994 | Koerlin et al. | 280/250.1 |
| 5,333,887 | 8/1994 | Luther . | |
| 5,340,140 | 8/1994 | Bynum | 280/304.1 |
| 5,401,045 | 3/1995 | Foerster et al. | 280/250.1 |
| 5,547,245 | 8/1996 | Knouse . | |

FOREIGN PATENT DOCUMENTS

| | | | |
|---|---|---|---|
| 406154269 | 6/1994 | Japan | 280/250.1 |
| 2 136 742 | 4/1983 | United Kingdom . | |
| 9014064 | 11/1990 | WIPO | 280/250.1 |

OTHER PUBLICATIONS

Nemschoff, Dialysis Chair™, Patient Seating Publication.
Nemschoff, Pristo™ Treatment Chair, Patient Seating Publication.

*Primary Examiner*—Anne Marie Boehler
*Attorney, Agent, or Firm*—Harness, Dickey & Pierce, P.L.C.

[57] ABSTRACT

A wheeled reclining chair is provided which includes an improved swing link assembly for permitting the seat back assembly to recline approximately 180° relative to the seat assembly to provide a substantially flat occupant-supporting surface such that the seat back provides a rearwardly extending cantilevered surface and the leg rest assembly provides a forwardly extending cantilevered surface from the chair frame assembly. The swing linkage assembly includes a pair of front slide assemblies and a pair of rear swing linkage mechanisms which suspend and operably couple the seat assembly to the chair frame for providing the desired reclining motion. A mobile base assembly having front and rear wheels which can be removed from the base assembly is also provided. The wheeled reclining chair includes a tilt linkage mechanism for tilting the chair frame relative to the mobile base assembly. The mobile base assembly optionally includes brakes which can be actuated either by the seat occupant, or by a care giver for preventing movement of the wheeled health care chair.

86 Claims, 16 Drawing Sheets

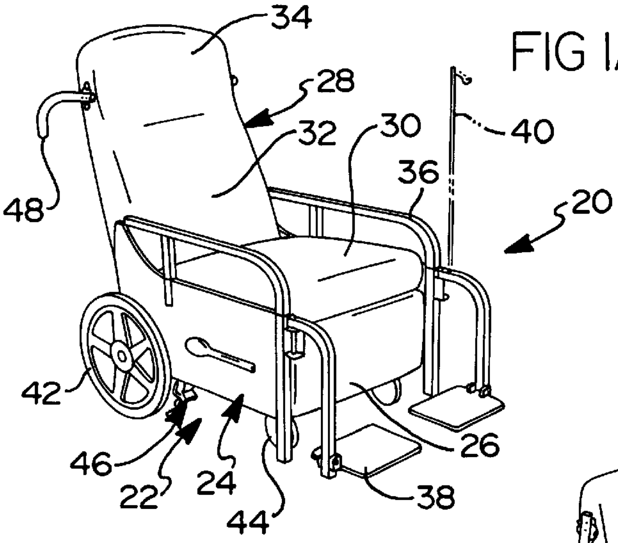
FIG IA
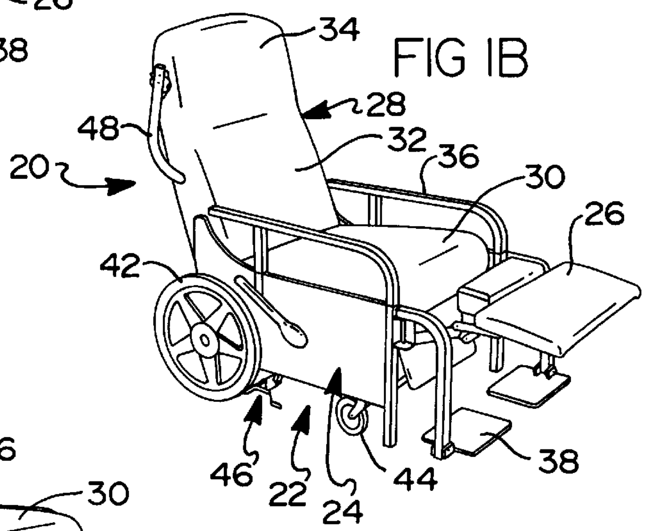
FIG IB
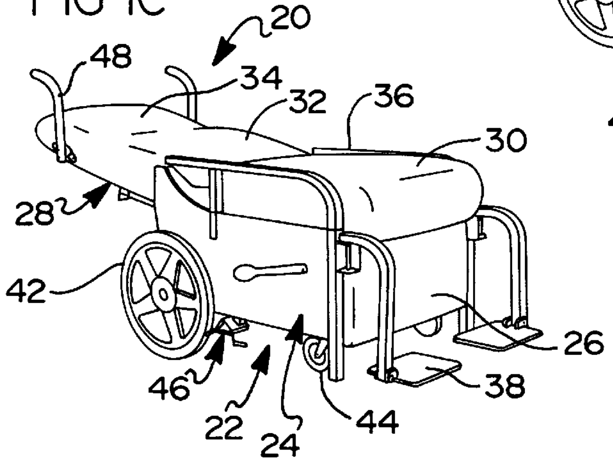
FIG IC
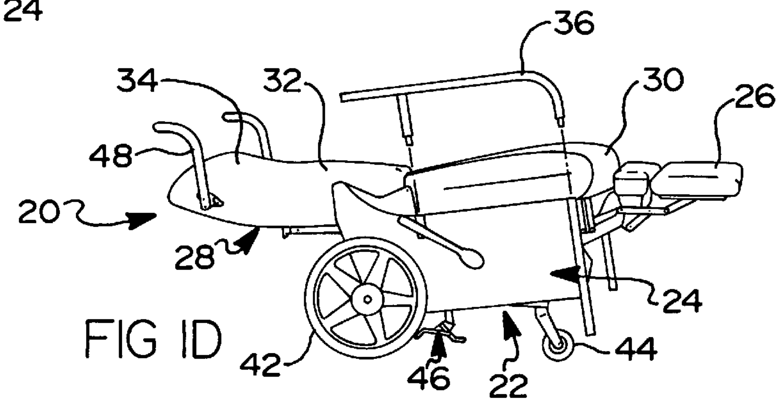
FIG ID

FIG 1E
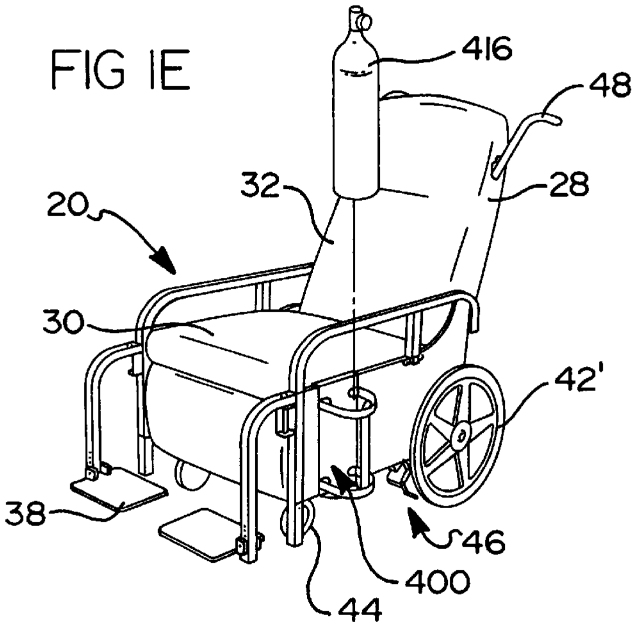
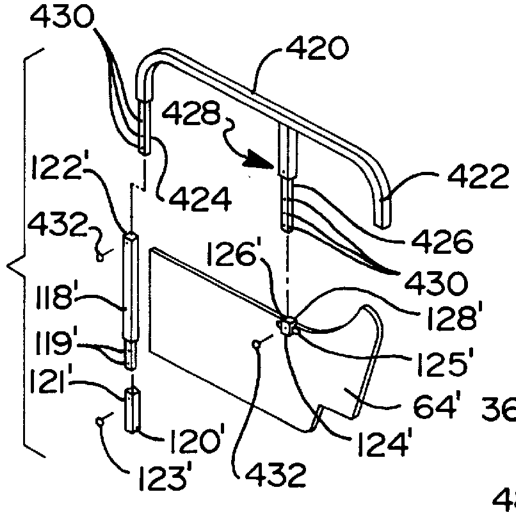
FIG 2B
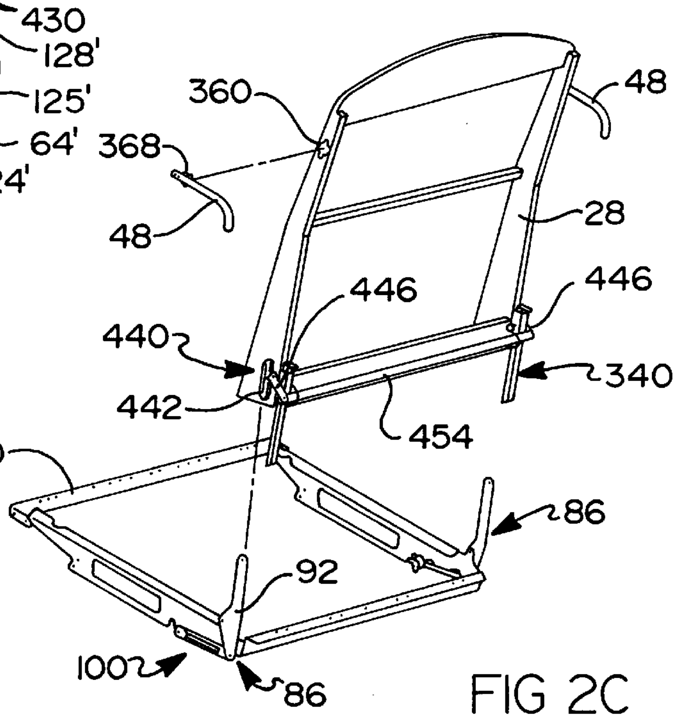
FIG 2C

FIG 5
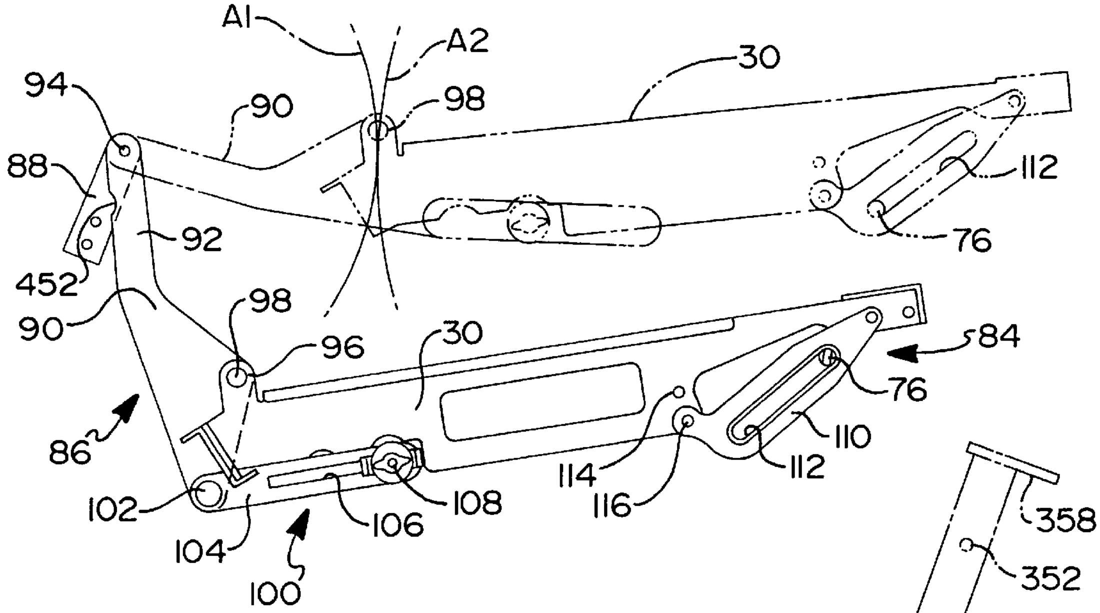
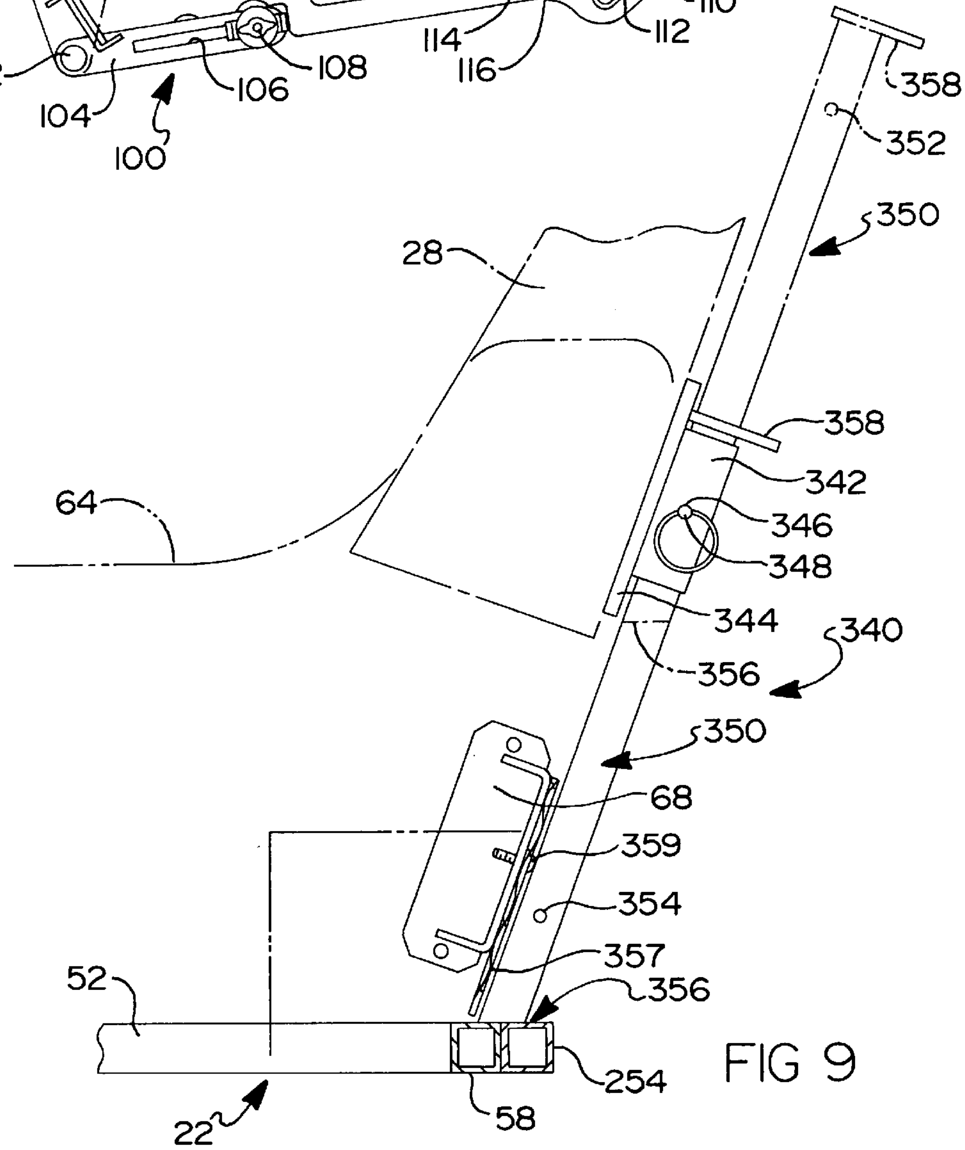
FIG 9

FIG 9B
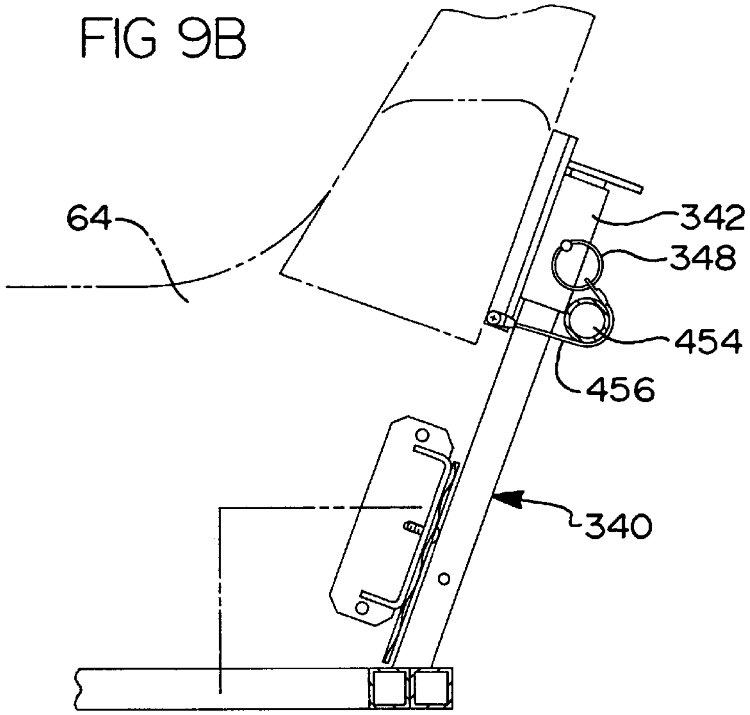
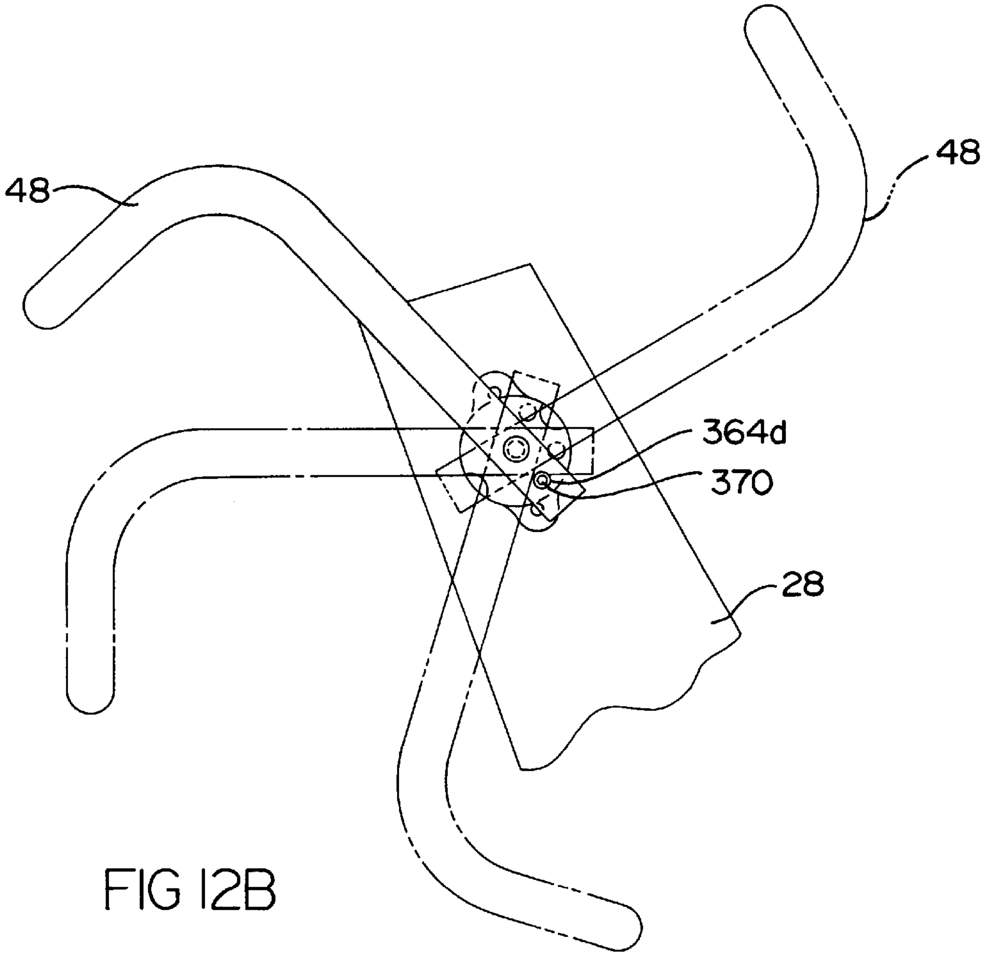
FIG 12B

FIG 11
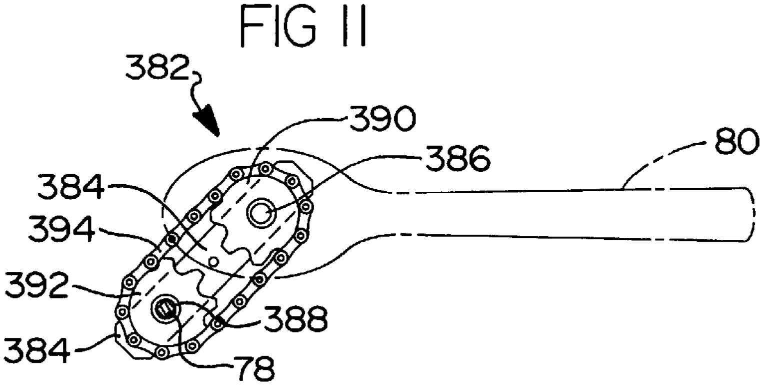
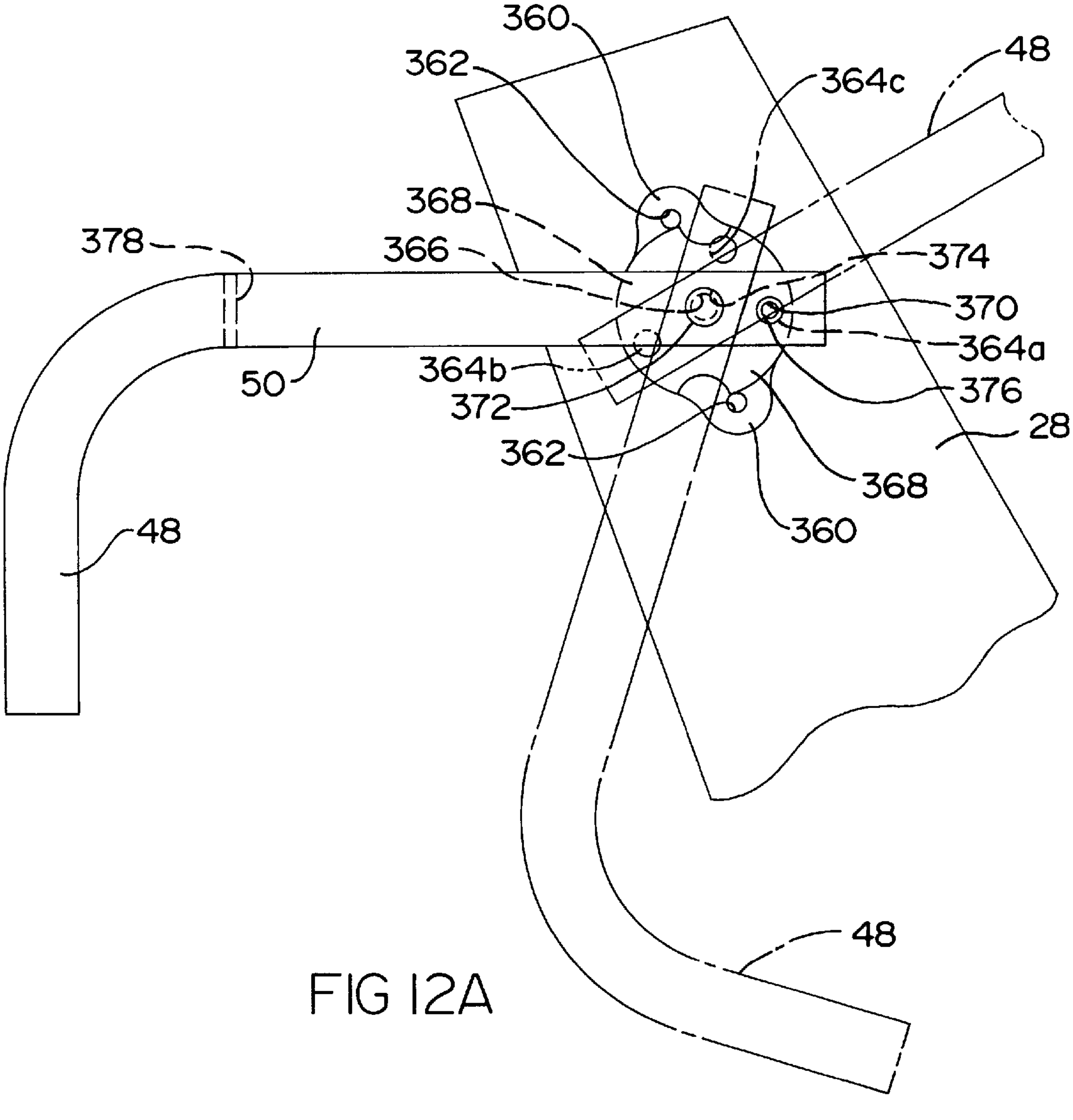
FIG 12A

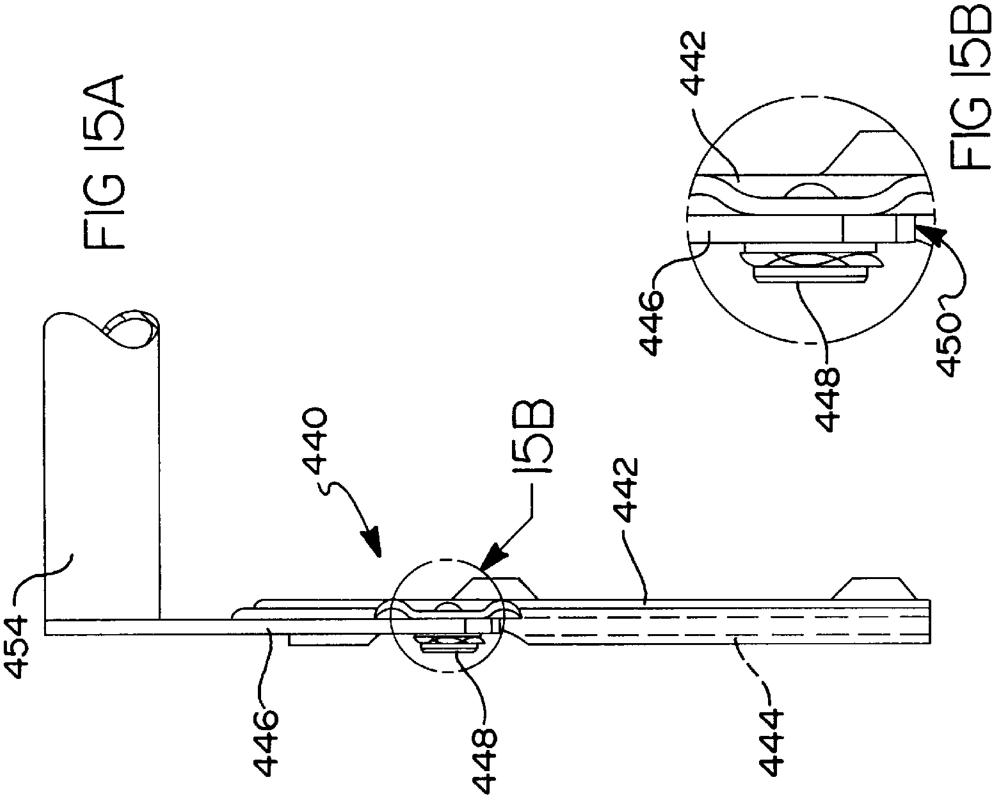
FIG 15A
FIG 15B
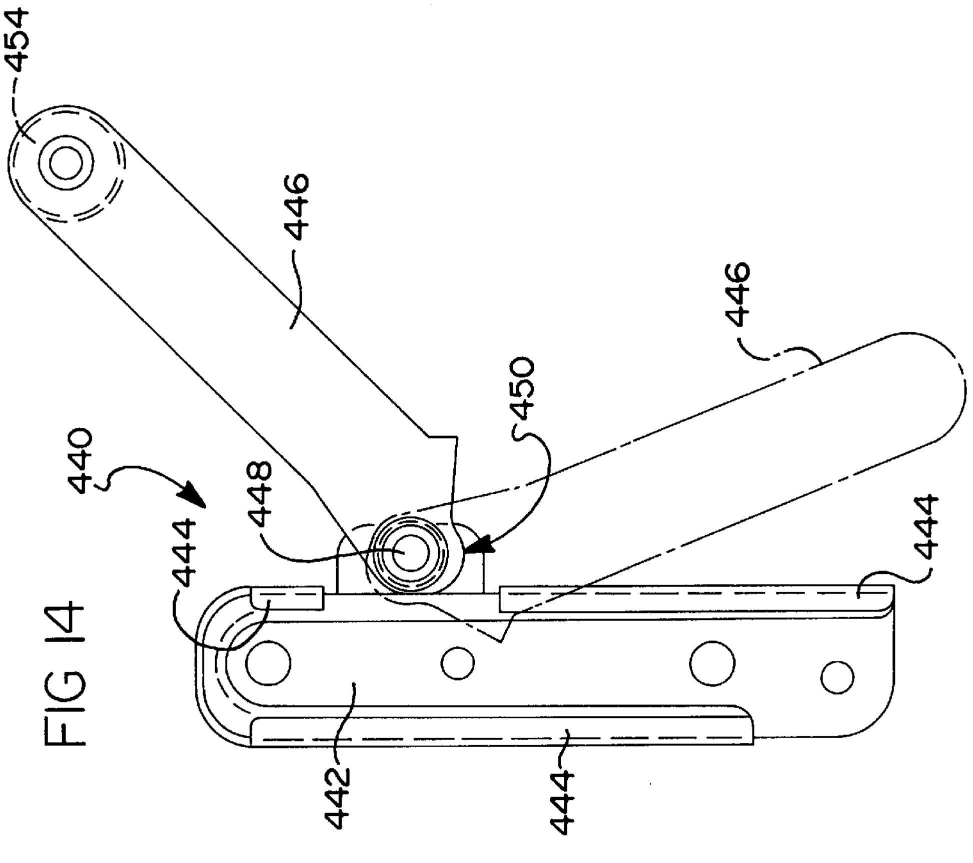
FIG 14

WHEELED HEALTH CARE CHAIR

CROSS-REFERENCE TO RELATED APPLICATION

The instant patent application is a continuation-in-part of U.S. patent application Ser. No. 08/751,509 filed Jan. 8, 1997, abandoned, the entire disclosure of which is hereby incorporated by reference.

BACKGROUND OF THE INVENTION

1. Technical Field

The present invention relates generally to a wheeled health care chair and, more specifically, to a reclining chair supported by a mobile base assembly for use in a health care environment which includes various features which serve to enhance the comfort of the seat occupant.

2. Description of Related Art

Wheeled chairs are widely used in a variety of both residential and commercial health care applications, and as such, are adapted to mobilize the seat occupant under a wide range of conditions. The prior art discloses various wheeled chairs which include features such as tilting foot rest assemblies, extendable leg rest assemblies, and reclining mechanisms which are movable between an upright position, a reclined position, or even a substantially flat gurney position. Traditionally, these wheeled chairs include large rear wheels so that the chair can be propelled more easily by the occupant. These larger wheels also provide added mobility over rough or uneven surfaces. However, the prior art discloses conventional wheel chairs which are geared more toward mobility of the seat occupant, and less toward the functionality and comfort of the seat occupant.

The frames of conventional wheel chairs are typically designed to be lightweight, which limits the number of comfort features which can be supported by or secured to the chair frame. Many of these frames tend to be hinged structures which also allow the wheel chair to be folded up into a more compact form. Accordingly, the ability to fold-up these chair frames, in addition to providing a chair frame which is convertible between a chair and a gurney, traditionally limits the amount of padding which can be included with the upholstering of the seat cushion and seat back. Thus, the prior art wheeled chairs tend to be lightweight and highly mobile, yet can be exceedingly uncomfortable to the chair occupant, especially to an occupant who spends significant amounts of time in a seated or reclined position. Further, these prior art wheeled chairs disclose seat backs which, although recline, do not provide any rearward tipping within the chair frame for properly supporting the weight of the occupant in a comfortable and orthopedically correct seated position.

Additionally, the prior art wheeled chairs are typically designed for specialized or limited purposes. More specifically, a wheeled chair with a reclining feature may not include an adjustable foot rest feature. A particular wheeled chair may be designed for only indoor use, and not for outdoor use. Additionally, a wheeled chair which is convertible into a gurney, will likely have inadequate contoured lumbar and head rest support for an occupant seated in the upright position. Thus, a wheeled health care chair which provides a wide range of functionality to the seat occupant appears to be conspicuously absent from the prior art.

Furthermore, there is a growing trend of providing for the health care needs of elderly and physically challenged individuals outside of a medical center environment. Many of these health care services are even provided within the individuals' homes. As such, it is desirable to provide a wheeled health care chair which is mobile, in that a care giver can easily push and control the direction of the chair, and the seat occupant can also self propel the chair. It is also desirable to provide a wheeled chair having outside dimensions which allow the chair to be easily maneuvered through residential doorways. Optionally, such a chair could allow interchangeable wheels so that an occupant could more easily self propel the chair using a larger set of wheels. In addition, it is desirable to provide a mobile chair which places significant emphasis upon the comfort features so that an individual spending longer periods of time within the chair is comfortable. It is also desirable to provide a wheeled chair which is convertible between a seating unit and a gurney style bed so that the occupant can be easily transferred from the wheeled chair in its gurney position to a bed. This feature could be enhanced with arm rests in which the vertical position of each arm rest can be selectively adjusted. It is also desirable to provide an assembly for supporting an oxygen bottle to assist in the care of the occupant during transportation. Accordingly, it is desirable to provide a wheeled chair which can simultaneously meet all of these specialized needs, while providing a comfortable and functional environment for the occupant.

SUMMARY OF THE INVENTION

In accordance with the principles of the present invention, a wheeled chair is disclosed which is adapted for use in a health care environment. As a primary object of the present invention, a wheeled reclining chair is provided which includes an improved swing link assembly for permitting the seat back assembly to recline approximately 180° relative to the seat assembly to provide a substantially flat occupant-supporting surface such that the seat back provides a rearwardly extending cantilevered surface and the leg rest assembly provides a forwardly extending cantilevered surface from the chair frame assembly. The swing linkage assembly includes a pair of front slide assemblies and a pair of rear swing linkage mechanisms which suspend and operably couple the seat assembly to the chair frame for providing the desired reclining motion. A pair of arm rests can be selectively adjusted into a variety of vertical positions.

It is another object of the present invention to provide a chair frame assembly, actuation mechanism and leg rest assembly which can be simply and efficiently manufactured utilizing an integrated or knock down construction and which is reinforced to provide an extremely rigid structure.

It is an additional object of the present invention to provide a mobile base assembly having front and rear wheels which can be quickly and easily removed from the base assembly. Such a design would allow the mobile base assembly to accommodate a set of smaller rear wheels which can be interchanged with a set of larger rear wheels.

It is another object of the present invention to provide a wheeled reclining chair having a tilt linkage mechanism for tilting the chair frame relative to the mobile base assembly independent of other positioning of the reclining chair.

It is a further object of the present invention to provide a mobile base assembly having braking means which can be actuated either by the seat occupant, or by a care giver for preventing movement of the wheeled health care chair.

Additional objects, advantages and features of the present invention will become apparent from the following description and appended claims, taken in conjunction with the accompanying drawings.

DESCRIPTION OF THE DRAWINGS

FIGS. 1A through 1E are perspective views of an exemplary wheeled health care chair showing the various operative positions, including an upright position with the foot supports in their operative position, an upright position with the leg rest assembly fully extended, a fully reclined position with the leg rest retracted, a fully reclined position with the leg rest assembly extended to provide a substantially flat occupant-supporting surface, and showing the opposite side of the chair in the upright position illustrating the oxygen bottle support assembly;

FIG. 2B is an exploded perspective view showing the construction of the side frame panel for accommodating the adjustable arm rests in accordance with an alternate preferred embodiment of the present invention;

FIG. 2C is an exploded perspective view showing the lockable slide bracket associated with the alternate preferred embodiment of the present invention;

FIG. 5 is a simplified sectional view of the improved swing link mechanism showing the seat assembly in the upright position in solid lines and in the reclined position in phantom lines;

FIGS. 9A–9B illustrate the particular features associated with the seat back reclining lock out mechanism, and the lockable slide bracket assembly according to the alternate preferred embodiment of the present invention;

FIG. 11 is a side view showing the details of the chain drive mechanism which operates the transverse drive rod, in accordance with a preferred embodiment of the present invention;

FIGS. 12A–12B are side views showing the multiple positions associated with the rear push handles in accordance with a preferred embodiment of the present invention;

FIG. 14 is a side elevation view of the lockable slide bracket assembly according to an alternate preferred embodiment of the present invention;

FIGS. 15A–15B are front elevation views of the lockable seat slide assembly shown in FIG. 14;

DETAILED DESCRIPTION OF THE INVENTION

Figure 2A:
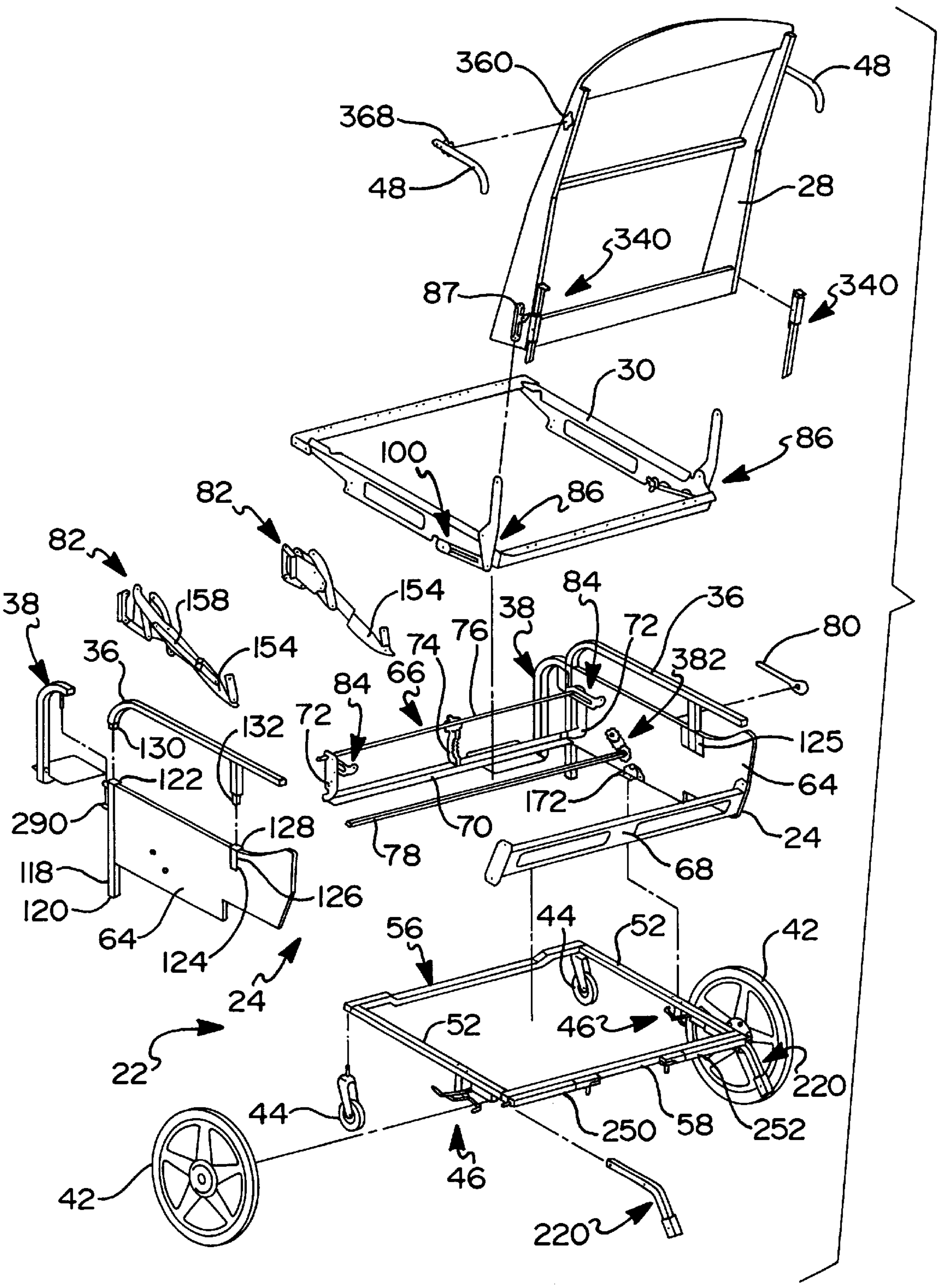
FIG. 2A is an exploded perspective view of a wheeled health care chair in accordance with a preferred embodiment of the present invention with upholstery, springs and other parts removed from the frame components for illustrating the integrated and interdependent association of these components.

In accordance with the teachings of the present invention, a wheeled chair adapted for use in a health care environment is disclosed having a mobile base assembly and leg rest assembly, and which incorporates a swing linkage mechanism to permit the seat back to be reclined approximately 180° relative to the seat. In a preferred embodiment, the wheeled health care chair is provided with an independent tilting mechanism interdisposed between the mobile base assembly and the chair frame for tilting the chair frame assembly relative to the mobile base assembly. With particular reference now to the drawings, the structural and functional aspects of the present invention are described with more particular detail.

Referring now to FIGS. 1 through 8, wheeled reclining chair 20 includes a mobile base assembly 22 supporting chair frame assembly 24. Leg rest assembly 26 is positionable between a retracted position as shown in FIG. 1A and an extended position as shown in FIGS. 1B and 1D. A seat assembly including seat back 28 and seat 30 are suspended within chair frame assembly 24 and operably coupled thereto for positioning between an upright position and a fully or "deep" reclined position. As used throughout the specification, "deep recline" refers to the position where seat back 28 is substantially flat with respect to seat 30 such that the angle therebetween is approximately 180° as best seen in FIGS. 1C and 1D. In the deep reclined position, seat back 28 and seat 30 define a substantially flat occupant supporting surface which is also substantially parallel to the floor surface, and thus provides a bed-like or gurney type surface. FIG. 1E shows the opposite side of wheeled reclining chair 20 which is ideally suited for accommodating oxygen bottle support assembly 400. In this alternative preferred embodiment, oxygen bottle support assembly 400 includes means for hanging the assembly from side frame panel 64. FIG. 1E further illustrates the larger rear wheels 42', preferably 18 inches (46 cm), which can be utilized with chair 20 according to the alternative preferred embodiment of the present invention.

Wheeled chair 20 also includes various features which better suit the apparatus for use in a health care environment. For example, seat back 28 is contoured to include a lumbar support 32 and a head rest 34 which provide additional comfort to an occupant seated for extended periods of time. Additionally, wheeled chair 20 can accommodate a pair of foot rest assemblies 38. Optionally, an IV pole 40 can be supported from either the left or right foot rest assembly 38. As illustrated, chair frame assembly 24 also includes removable rear wheels 42 and a pair of removable arm rests 36 located on the top portion thereof. Movement of wheeled chair 20 is facilitated by a pair of removable front casters 44. Left and right hand brake assemblies are provided for selectively and independently braking rear wheels 42. A pair of push handles 48 are provided to assist a care giver in controlling and steering wheeled chair 20. It should be particularly noted that rear wheels 42 are smaller than conventional wheel chair wheels to accommodate the comfort features associated with the present invention. However, rear wheels 42 are large enough to allow the seat occupant to maneuver the chair 20 by selectively rotating each wheel by hand, or by an optional push ring 183 (FIGS. 3 and 4) mounted to each rear wheel 42.

Referring now to FIGS. 2A through 8, the wheeled healthcare chair 20 according to the present invention is illustrated. With particular reference to FIG. 2, wheeled chair 20 includes mobile base assembly 22 supporting chair frame assembly 24, which is operably coupled to mobile base assembly 22. Mobile base assembly 22 includes a pair of mobile base side rails 52 laterally spaced by a pair of front and rear cross members 56, 58 defining a substantially rectangular base frame. Mobile base side rails 52 are preferably formed out of square aluminum tubing having a top surface 54 to which each side frame panel 64 can be pivotally secured. Front and rear cross members 56, 58 are also preferably formed from square aluminum tubing for both strength and weight savings. Front casters 44 extend downwardly from the front corners of mobile base assembly 22 and are operably coupled thereto such that casters 44 are able to rotate about a vertical axis. A pair of rear wheels 42 are secured within the rear cross member 58 of mobile base assembly 22. Accordingly, the combination of front casters 44 and rear wheels 42 provide the necessary mobility for wheeled chair 20. Alternatively, one skilled in the art would readily recognize that casters 44 and rear wheels 42 could be replaced with stationary leg portions (not shown) for providing a stationary health care reclining chair similar to the wheeled health care reclining chair 20 disclosed herein as the preferred embodiment of the present invention. It should also be noted that the dimensions of chair frame 24 are sized to be narrow enough such that wheeled chair 20 will easily fit through typical residential doorways. As such, the chair frame 24 and its associated mechanisms are designed to minimize the width of the wheeled chair 20 and maximize the width of the seat 30 to fit various sized seat occupants.

With particular reference to FIG. 2A, chair frame assembly 24 includes a pair of side frame panels 64 interconnected and laterally spaced by front and rear chair frame cross members 66, 68. Side frame panels 64 may be cut from furniture grade plywood or other suitable material. As presently preferred, front chair frame cross member 66 is a multi-piece assembly including lower cross member segment 70, left and right end member segments 72 extending upwardly opposite lateral ends of lower cross member segment 70, and central segment 74 disposed substantially midway between end member segments 72. A front support shaft 76 extends laterally between end member segments 72 and secured to central segment 74. Front support shaft 76 serves to support a front portion of seat frame 30, pantograph linkage assembly 82 and various other structural links which will be described in more detail herein.

Drive rod 78 is suspended from and operably coupled to side frame panels 64 for rotation therein. A chain drive assembly 382 allows actuation handle 80 to be mounted upwardly and forwardly from drive rod 78 on side frame panel 64 so as not to interfere with rear wheel 42. The chain drive assembly 382 allows handle 80 to be positioned in a variety of positions on the side frame panel 64 for different styles of chairs. Accordingly, movement of actuation handle 80 causes a corresponding rotational movement of drive rod 78 via chain drive assembly 382. The chain drive assembly 382 can be mounted on the right side, the left side, or both sides of the chair frame 24. Additionally, varying the sprocket ratio between drive sprocket 390 and driven sprocket 392 from the typical ration of 1:1 (one-to-one), varies the amount of rotation of handle 80 required to actuate the leg rest assembly 26 to facilitate ease of use. As presently preferred, front and rear chair frame cross members 66, 68 are formed as metal components and are assembled using a knock down or integrated construction technique. A more detailed description of these components and this construction technique can be found in U.S. Pat. No. 5,435,621 entitled "Modular Reclining Chair And Method" which is expressly incorporated herein by reference, and which is commonly owned by the Assignee of the present invention.

Each side frame panel 64 includes a forward anti-tip post 118 formed from square aluminum tubing having a foot portion 120 and an open top portion 122 for receiving the forward arm rest insert 130 of removable arm rest 36. Thus, open top portion 122 serves as a mounting bracket for removable arm rest 36. Forward anti-tip post 118 is secured to a mounting plate (not shown) which is then secured to the forward inside face of side frame panel 64. The primary function of forward anti-tip posts 118 is to prevent the accidental forward tipping of wheeled chair 20 beyond a safe operating position. Additionally, forward anti-tip posts 118 can support chair frame assembly 24 when front casters 44 are temporarily removed.

With continued reference to FIG. 2A, a rear arm rest mounting bracket 124 also formed from square aluminum tubing is secured within a slot 126 formed in each side frame panel 64 with a mounting plate 125. The top portion 128 of each rear arm rest mounting bracket 124 is open which provides a square recess for receiving the rear arm rest insert 132. As disclosed, the forward and rear arm rest inserts 130, 132 are plastic inserts, such as glass reinforced plastic, which are securely retained in the lower terminal ends of each removable arm rest 36 with a mounting screw. If one of the arm rest inserts 130, 132 is damaged during use, a new insert can be installed by removing the mounting screw and replacing the insert. The protruding end of each arm rest insert 130, 132 is releasably secured within its respective mounting bracket 122, 124 on each side frame panel 64. This feature, for example, allows each arm rest 36 to be individually installed, such as when a seat occupant is being transported, or individually removed, such as when the occupant is being transferred from the wheeled chair 20 in its gurney position (FIGS. 1C and 1D) to a bed. Preferably, the height of wheeled chair 20 when in its gurney position is approximately the same as the height of a residential bed, thus facilitating the transfer of an occupant from one to the other.

Figure 10:
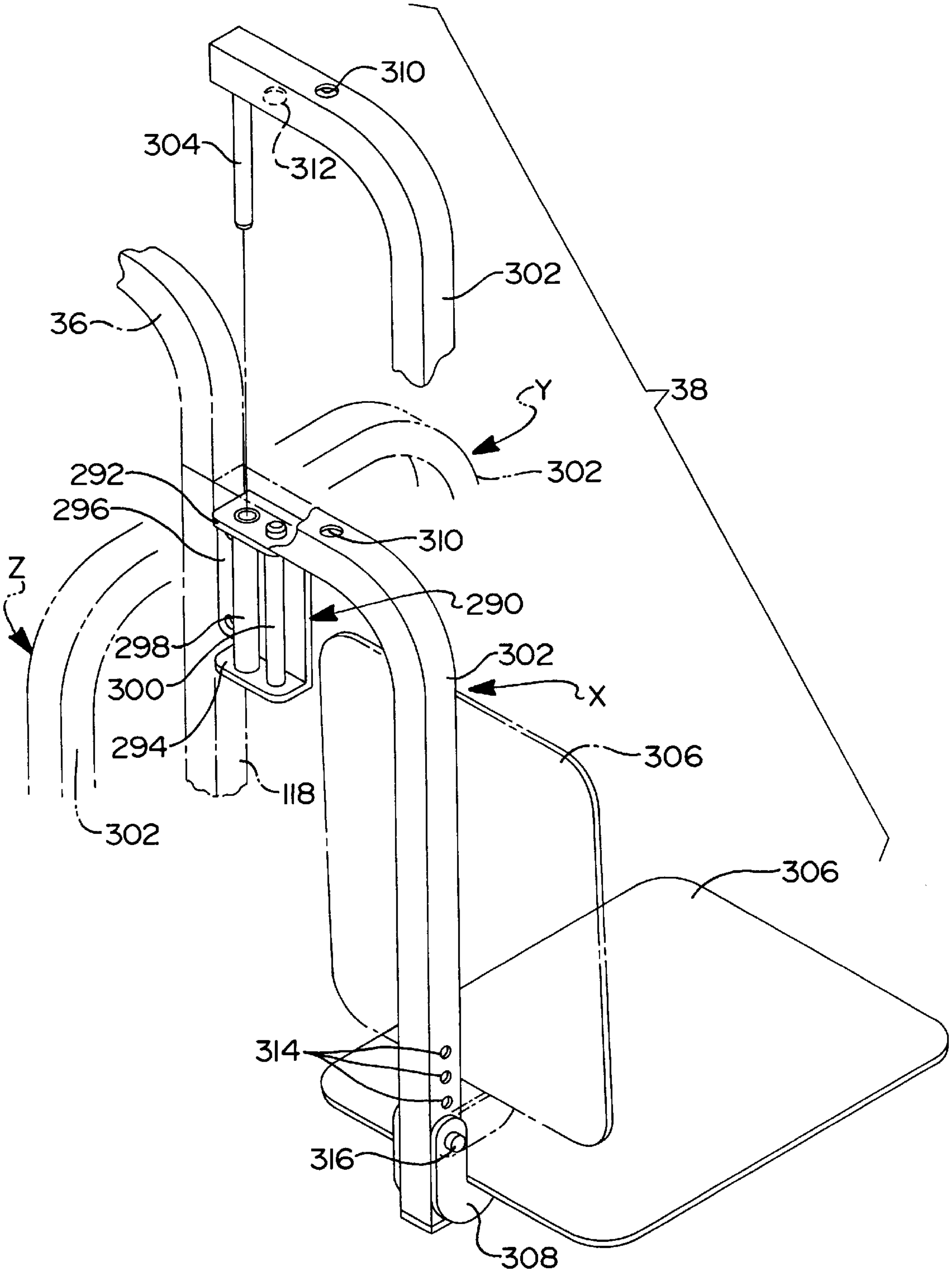
FIG. 10 illustrates the features associated with the removable foot rests in accordance with a preferred embodiment of the present invention.

Referring now to FIGS. 2A and 10, the foot rest assemblies 38 and their pivotal attachment to chair frame assembly 24 will be described in detail. More specifically, each side frame panel 64 has a foot rest mounting bracket 290 secured to a front portion thereof. As most clearly shown in FIG. 10, each foot rest mounting bracket 290 is a channel shaped member having upper and lower horizontal tabs 292, 294 forming the sides of the channel. A mounting flange 296 extends from the rear body of the mounting bracket 290 which secures the mounting bracket 290 to the inside face of side frame panel 64. Two sets of vertically aligned apertures are formed in upper and lower horizontal tab 292, 294. The set of rear upper and lower apertures are fitted with a metal sleeve 298, welded in place, which is flush with the top and bottom surfaces of each upper and lower horizontal tab 292, 294. The set of forward upper and lower apertures are fitted with a metal locating pin 300, also welded in place, which extends above and below the top and bottom surfaces of each upper and lower horizontal tab 292, 294 by approximately ⅛ inch (3 mm).

Once each foot rest mounting bracket 290 is securely fastened to its respective side frame panel 64, a foot rest assembly 38 can be releasably secured thereto. Each foot rest assembly 38 includes a support arm 302 having a mounting pin 304 permanently secured at an upper end, and a foot plate 306 pivotally secured at is lower end via pivot bracket 308. Support arm 302 further includes a plurality of apertures 314 formed in the lower portion thereof for receiving a hinge pin 316 which pivotally supports pivot bracket 308. Accordingly, the height of foot plate 306 can be adjusted by the selectable location of hinge pin 316 within one of the apertures 314 of support arm 302. An aperture 310 is formed in the top surface of support arm 302 for receiving an optional IV pole 40. As disclosed, support arm 302 is formed from thin walled square aluminum tubing.

With continued reference to FIG. 10, foot rest assembly 38 is attached to foot rest mounting bracket 290 by placing mounting pin 304 into metal sleeve 298 and sliding mounting pin 304 downward. A second locating aperture 312 is formed in the bottom surface of support arm 302. Locating aperture 312 is positioned to receive the upwardly extending portion of metal locating pin 300, the engagement of which serves to releasably lock support arm 302 in its forwardly extending position and prevent foot rest assembly 38 from rotating about the vertical axis of mounting pin 304. The forward extending position (denoted X) of support arm 302 is the primary position for use when a seat occupant, sitting upright, requires foot support from foot plates 306. Additionally, the location of foot plates 306, in either their up or down position, is such that they will not interfere with the extension or retraction of leg rest assembly 26 (FIG. 1C). Thus, the design of the wheeled chair 20 does not require that the foot rest assemblies 38 be removed before utilizing the recline and leg rest comfort features.

When each foot plate 306 is placed in its upstanding position, the support arms 302 can be independently rotated inwardly (denoted Y) for folding the foot rest assemblies 38 out of the way. This position becomes useful when storing or transporting wheeled chair 20 in a collapsed or compacted form. Alternatively, each foot rest assembly 38 can be independently rotated outwardly (denoted Z), also for folding the foot rest assemblies out of the way. This position is especially useful when the seat occupant is entering or exiting wheeled chair 20. It should also be noted that while metal locating pin 300 engages locating pin aperture 312 for locking support arm 302 into position X, locating pin 300 also serves to hold support arm 302 in positions Y and Z because the upwardly extending side portions of locating pin 300 engage the respective sides of support arm 302 thereby preventing unwanted rotation of the foot rest assembly 38. As such, support arm 302 must be lifted over the approximately ⅛ inch (3 mm) threshold created by locating pin 300 before rotating the foot rest assembly 38 in either direction.

With reference now to FIG. 2B, the features and construction associated with side frame panels 64' according to the alternative preferred embodiment of the present invention are shown in more detail. Each side frame panel 64' is substantially similar to side frame panel 64 as described above. The alternative construction of each side frame panel 64 includes a forward anti-tip post 118' having an adjustable foot portion 120' slidingly secured thereto. To accommodate the height selection of adjustable foot portion 120', anti-tip post 118' includes two apertures 119' formed in a lower portion thereof. Preferably apertures 119' are spaced one inch (2.5 cm) apart. Adjustable foot portion 120' likewise includes an aperture 121' for receiving a release pin 123'. Accordingly, adjustable foot portion 120' can be placed in either the upper position or the lower position by selectively placing release pin 123' through aperture 121' and through either the upper or lower apertures 119' respectively for securing the adjustable foot portion 120'. When wheeled reclining chair 20 is outfitted with the smaller 16 inch wheels 42, adjustable foot portion 120' should be placed in the upper position. Alternatively, adjustable foot portion 120' should be secured in its lower position when chair 20 is outfitted with the larger 18 inch wheels 42'. When the adjustable foot portion 120' is located in its proper operating position, forward anti-tip post 118' serves to prevent the accidental forward tipping of wheeled chair 20 beyond a safe operating position. As described above, forward anti-tip posts 118' can also support chair frame assembly 24 when front casters 44 are temporarily removed.

The alternative preferred embodiment of wheeled chair 20 includes an adjustable arm rest 420 which can be selectively placed in one of three vertical positions, or may be removed completely. With continued reference to FIG. 2B, the alternative preferred embodiment of wheeled chair 20 is shown with this adjustable arm rest 420. The top portion of anti-tip post 118' includes an open top portion 122' which serves as a mounting bracket for the adjustable arm rest 420. Each side frame panel 64' also includes a rear armrest mounting bracket 124' which is secured within a slot 126' formed in each side frame panel 64' with a mounting plate 125'. The top portion 128' of arm rest mounting bracket 124' is open, which provides a square recess for receiving a rear support portion of the arm rest 420. Each adjustable arm rest 420 includes a curved rear portion 422 which provides additional lateral support to an occupant, especially when wheeled chair 20 is placed in the fully reclined or gurney position. Each adjustable arm rest 420 includes a forward arm rest post 424 which is rigidly secured within the forward portion of arm rest 420. A rear arm rest post 426 is pivotally secured within arm rest 420 with a roll pin 428. This arrangement allows rear arm rest post 426 to pivot slightly fore and aft about roll pin 428 which greatly assists in adjusting the vertical position of each arm rest 420, and also assists insertion and removal of front and rear arm rest posts 424, 426 within mounting brackets 122', 124'. Further, the pivoting feature of rear arm rest post 426 prevents binding of posts 424, 426 within mounting brackets 122', 124'. The front and rear arm rest posts 424, 426 include a series of three apertures 430 through which a pair of release pins 432 can be secured for selectively adjusting the vertical position of each arm rest 420.

Referring now to FIGS. 2C and 14–15B, the locking slide bracket assembly 440 associated with the alternate preferred embodiment of the present invention is disclosed. More particularly, locking slide bracket assembly 440 includes a slide bracket 442 having a plurality of tabs 444 which allow the slide bracket 442 to be slid down over the upstanding portion 92 of rear swing link 90. Each slide bracket 442 is rigidly secured to the outside surface of the vertical posts forming seat back 28 with a plurality of fasteners (not shown). A locking lever 446 is pivotally secured to slide bracket 442 at pivot 448. Each locking lever 446 includes a cam portion 450 which engages a recess 452 formed in the rear swing link 90 when the locking lever 446 is placed in the downward position. Each locking lever 446 is secured to opposite ends of a connecting handle 454. As such, the connecting handle 454 facilitates the simultaneous movement of locking levers 446.

As best viewed in FIG. 9B, the geometry of locking levers 446 and connecting handle 454 are designed such that the retaining cable 456 connected to the ring member of release pin 348 can be wrapped around connecting handle 454 to prevent the accidental raising of the locking slide bracket assembly 440. When connecting handle 454 and locking levers 446 are secured in the downward position, seat back 28 becomes lockingly engaged with seat 30 so that seat back 28 will not become accidentally disengaged from chair 20. To remove seat back 28 for transport or cleaning, cable 456 must be removed from around connecting handle 454 so that connecting handle 454 and locking levers 446 can be raised for disengaging cam portion 450 from recess 452. This is accomplished by first removing release pin 348 from aperture 346 of slide tube 342. Accordingly, slide bracket 442 can then be removed from rear swing link 90 for removal of seat back 28.

Figure 3:
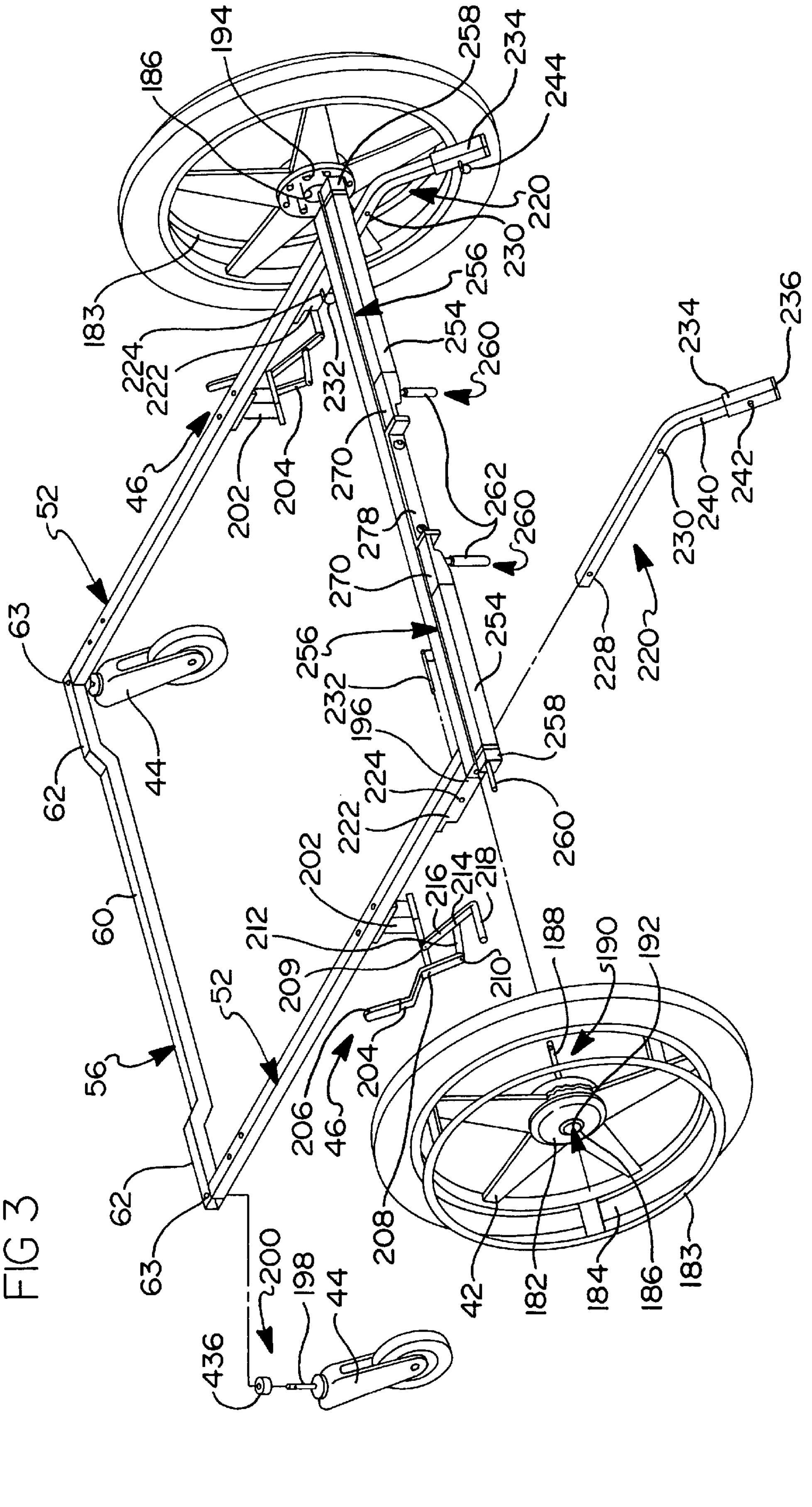
FIG. 3 is a partially exploded perspective view of the mobile base assembly in accordance with a preferred embodiment, and an alternate preferred embodiment of the present invention.
Figure 4:
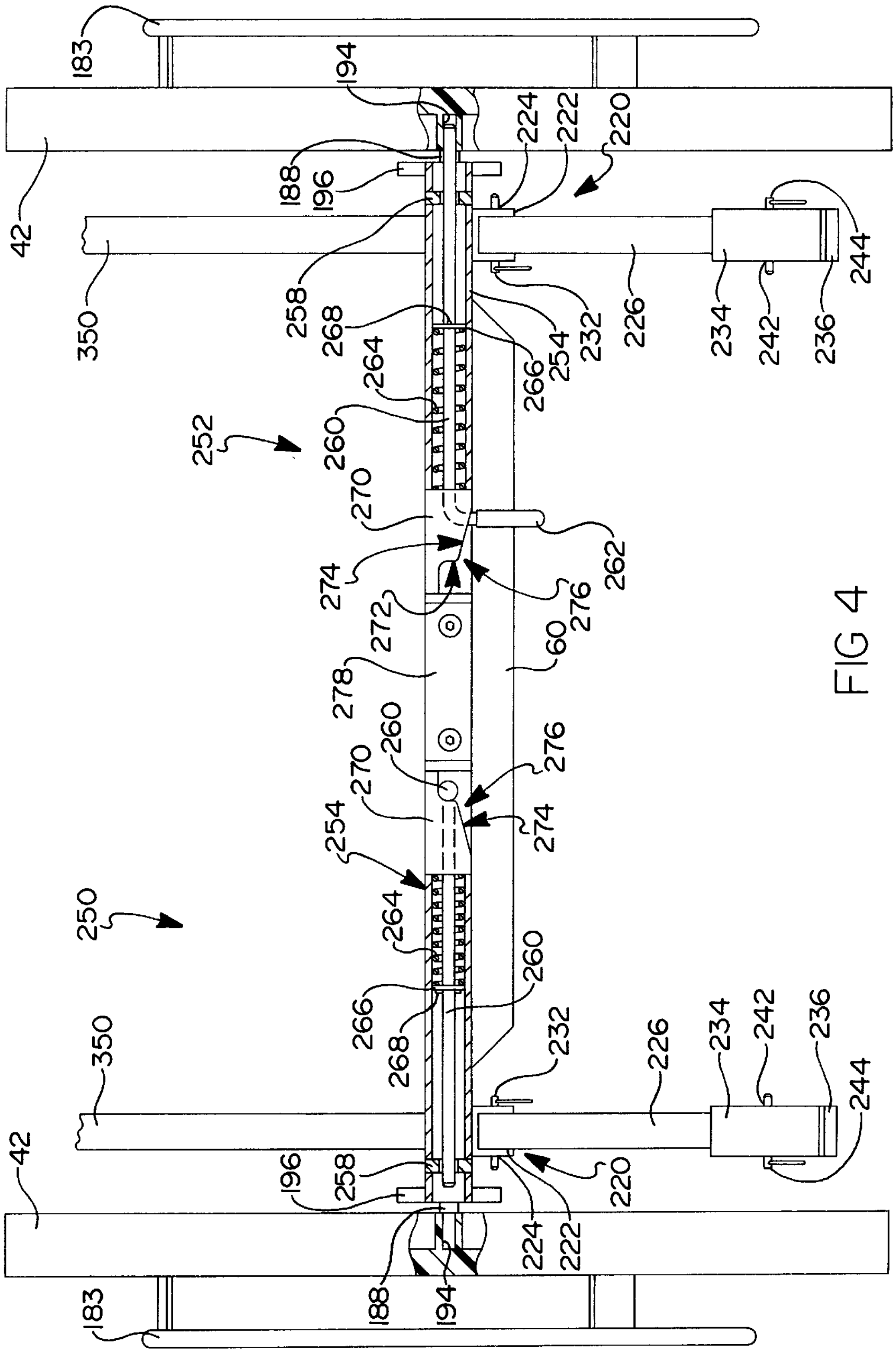
FIG. 4 is a rear elevation view of the mobile base assembly, also in accordance with a preferred embodiment of the present invention.

Referring now to FIGS. 3 and 4, the components and operation of mobile base assembly 22 are further illustrated. The front cross member 56 of mobile base assembly 22 has a central portion 60 which is slightly lower than the symmetrical end portions 62. This central portion 60 receives a pair of offset support brackets 142 having rubber feet 144 disposed thereon (seen in FIGS. 7 and 8). These support brackets 142 are mounted to the lower surface of lower cross member segment 70. The front corners at which the front cross member 56 and each laterally spaced base rail 52 are welded have an aperture 63 formed therein. These apertures 63 can be smooth bored with a circular recess for receiving a quick release mechanism 200 which is part of each front caster axis pin 198. Alternatively, these apertures 63 can be threaded for receiving a bolt forming caster axis pin 198 which secures front casters 44 to the mobile base assembly 22.

Also shown in FIG. 3 is the spacer sleeve 436 used in conjunction with the alternate preferred embodiment of the present invention. As disclosed, spacer sleeve 436 is fitted over caster axis pin 198 before the front casters 44 are secured to the mobile base assembly 22. Preferably, spacer sleeves 436 are approximately one inch (2.5 cm) tall and must be used in conjunction with the larger 18 inch rear wheels 42' in order to maintain mobile base assembly 22 in a substantially parallel position with respect to the ground.

The rear cross member 58 of base assembly 22 is secured to the butt ends of each mobile base side rail 52 with a welded joint. Each end portion of the rear cross member 58 is fitted with an axle sleeve 196 having a suitable aperture 197 (not shown) formed therein for receiving a quick release pin 188. Each rear wheel hub 182 has an axle pin 188 having a quick release mechanism 190 formed therein. As disclosed, the axle pin 188 locks within the axle pin sleeve 196 when the axle pin 188 is inserted into the axle sleeve 196. A quick release button 192 is provided on the outside of each wheel hub 182 to allow the wheel 42 to be disengaged from the axle sleeve 196.

Rear wheel 42 is preferably formed from plastic and has five spokes radiating therefrom. A rubber tire 184 is retained by the outer rim of wheel 42. Optionally, the outer rim of each wheel hub 182 can be fitted with a push ring 183 which can be grasped and rotated by the seat occupant, thereby allowing the seat occupant to easily maneuver the wheeled chair 20. Wheel hub 182 includes a bearing 186 formed therein for rotatingly securing axle pin 188. As disclosed, the quick release mechanism 190 associated with axle pin 188 is a spring biased camming pin which retains two ball bearings at the end of axle pin 188 into contact with a circular recess (not shown) formed within axle sleeve 196. When a button 192 located on the outboard side of wheel hub 182 is depressed, the camming pin releases the ball bearings, and axle pin 188 can be removed from axle sleeve 196. While it should be understood that such a quick release mechanism 190 is well known within the art, other suitable quick release mechanisms are within the scope of the present invention. Additionally, the front casters 44 associated with the preferred embodiment of the present invention also include a quick release mechanism similar to the one discussed above for rear wheels 42. One skilled in the art will appreciate that wheeled chair 20 is capable of supporting a seat occupant with the front casters 44 and/or rear wheels 42 removed from the mobile base assembly 22.

The rear portion of base assembly 22 further includes left and right rear parking brake assemblies 250, 252. For simplicity, the structure and operation of only one rear brake assembly 250 will be described herein. It will be appreciated by one skilled in the art that while each rear parking brake assembly 250, 252 operates in the same fashion, each parking brake assembly 250, 252 can be independently engaged or disengaged. The rear parking brake assemblies 250, 252 are positioned on mobile base assembly 22 to prevent extraneous or unwanted use by the seat occupant. Rear brake assembly 250 includes a brake housing 254 for receiving a parking brake rod 260. Preferably, each brake housing 254 is formed from square aluminum tubing. The parking brake rod 260 is formed from round metal stock formed into an L shape. The long end of parking brake rod 260 protrudes through a round aperture formed in the end sleeve 258 secured to outboard end of brake housing 254. The opposite end, or inboard end, of brake housing 254 has a multi-contoured parking brake stop 270 abutted thereto. The parking brake stop 270 is preferably formed from plastic, such as nylon. Each parking brake stop 270 is contoured such that the parking brake rod 260 can be retracted (disengaged) whereby its shorter end can rest upon a first ledge portion 272 formed on the parking brake stop 270. In this position, the long end of parking brake rod 260 is retained completely inside of brake housing 254, and since the parking brake rod is withdrawn from any of the parking brake apertures 194 formed in each wheel hub 182, rear wheel 42 is free to rotate. The rear parking brake rod 260 can be engaged so that its long end extends from brake housing 254 and engages one of the parking brake apertures 194 by rotating the parking brake rod 260 downward, one quarter turn, which disengages the parking brake rod 260 from the first ledge portion 272. When parking brake rod 260 is in the engaged position, rear wheel 42 is locked and cannot rotate about its axle. As a convenience feature, each parking brake 250, 252 can be easily engaged by a caregiver, placing their foot on the parking brake rod 260, and rotating the rearwardly extending portion of the parking brake rod 260 downward. As best illustrated in FIG. 4, left parking brake 250 is disengaged, and right parking brake 252 is engaged. From the drawings, one skilled in the art will appreciate that each parking brake rod 260 is biased into the engaged position by a compression spring 264 held in place by a washer 266 and a transverse retaining pin 268 at one end, and parking brake stop 270 at the opposite end. Additionally, parking brake rod 260 includes a plastic cover 262 retained on its short end to assist in grasping parking brake rod 260. An angled transition surface 274 of parking brake stop 270 guides the short end of parking brake rod 260 into a second channel portion 276. Accordingly, to disengage the parking brake rod 260, the rod 260 must be longitudinally retracted through the second channel portion 276 and over and past the angled transition surface 274 approximately one inch (2.5 cm) before it can be rotated upward one quarter turn to reengage the first ledge portion 272.

Each rear parking brake assembly 250, 252 also includes an L-shaped aluminum spacer bracket 256 which is welded between the brake housing 254 and rear cross member 58 at two locations. Additionally, a U shaped spacer bracket 278 is provided between each parking brake stop 270 to securely hold each parking brake stop 270 in abutting engagement with the brake housing 254. The U shaped bracket 278 also serves to prevent each parking brake rod 260 from being pulled out of its brake housing 254.

An additional feature associated with base assembly 22 is a pair of left and right rear anti-tip assemblies 220. With continued reference to FIGS. 3 and 4, each anti-tip assembly 220 includes a slide tube bracket 222 having an aperture 224 bored therethrough. As disclosed, each slide tube bracket 222 is welded to the lower surface of each of the laterally spaced base side rails 52. An L shaped anti-tip bar 226 having outside dimensions which are slightly less than the inside dimensions of slide tube bracket 222, is slidingly engagable with slide tube bracket 222. Anti-tip bar 226 includes at least a forward aperture 228 and a rear aperture 230 formed in its horizontal portion for receiving a ball release pin 232 which extends both through slide tube bracket 222 and anti-tip bar 226. As disclosed, anti-tip bar 226 is approximately L-shaped, with the angle between its horizontal and vertical portions being approximately 100°. The opposite end of anti-tip bar 226 includes an adjustable foot tube 234 having a rubber foot portion 236 which fits over the outer surfaces of the anti-tip bar 226. This second portion of the anti-tip bar 226 includes at least an upper aperture 240 and a lower aperture 242 formed therein for receiving a ball release pin 244, thereby making the foot tube 234 adjustable between an upper and lower position. Accordingly, the anti-tip bars 226 can be individually extended or retracted from the base assembly 22, and locked into these positions by ball release pin 232. Also, each foot tube 234 can be adjusted between a range of high or low positions, thereby selectively adjusting the tolerated amount of rearward tip of mobile base assembly 22. Each foot tube 234 can also be locked with ball release pin 244. As such, anti-tip bars 226 prevent the accidental rearward tipping of wheeled chair 20 beyond a safe operating position. With brief reference to FIG. 6, rear anti-tip assembly 220 is illustrated in the forward position. Alternatively, FIG. 7 illustrates rear anti-tip assembly in the rear or extended position.

Figure 7:
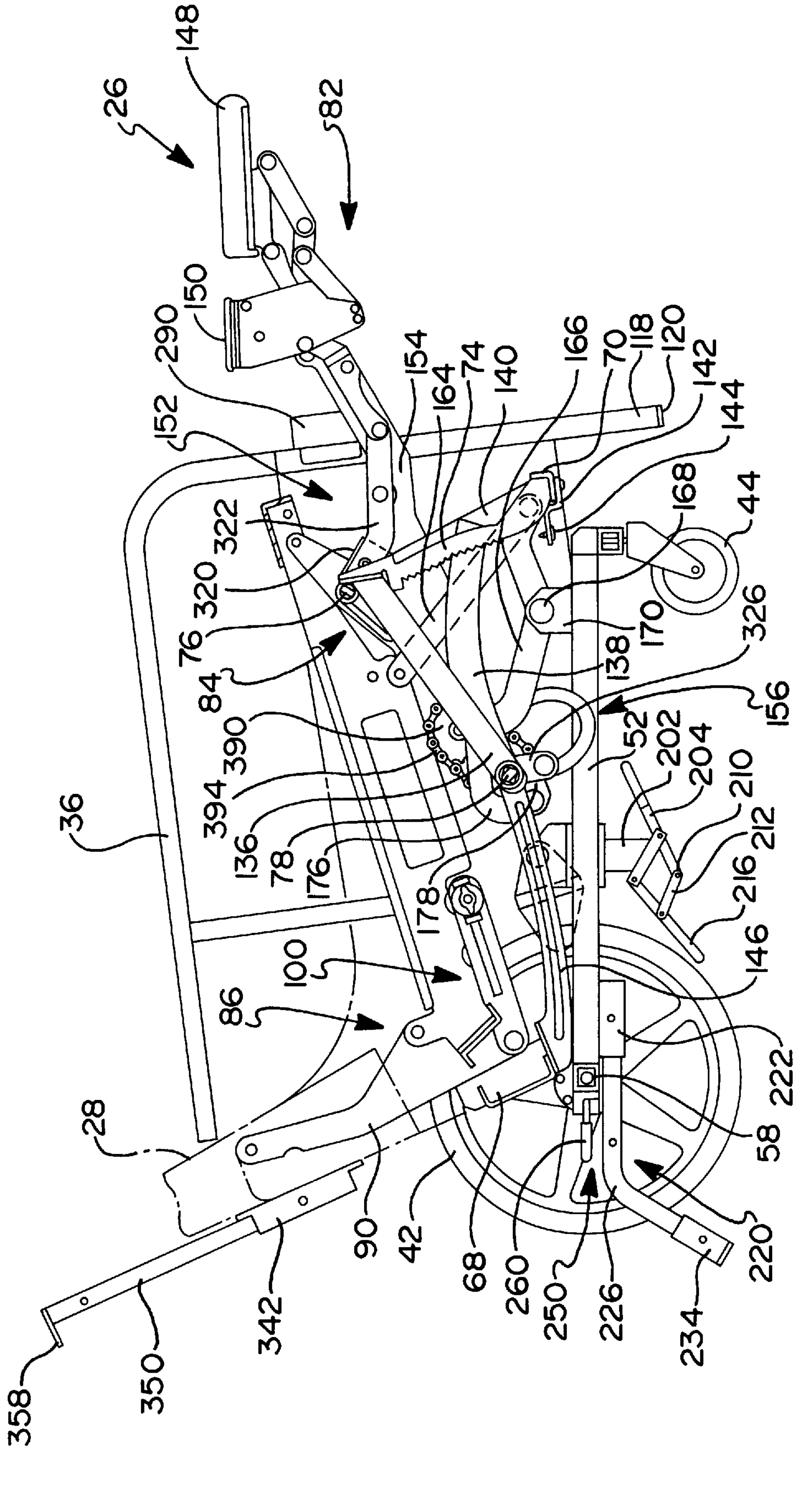
FIG. 7 is a simplified sectional view similar to FIG. 6 illustrating the seat back in the upright position and the leg rest assembly in the extended position such that the chair frame assembly is tilted relative to the mobile base assembly.
Figure 8:
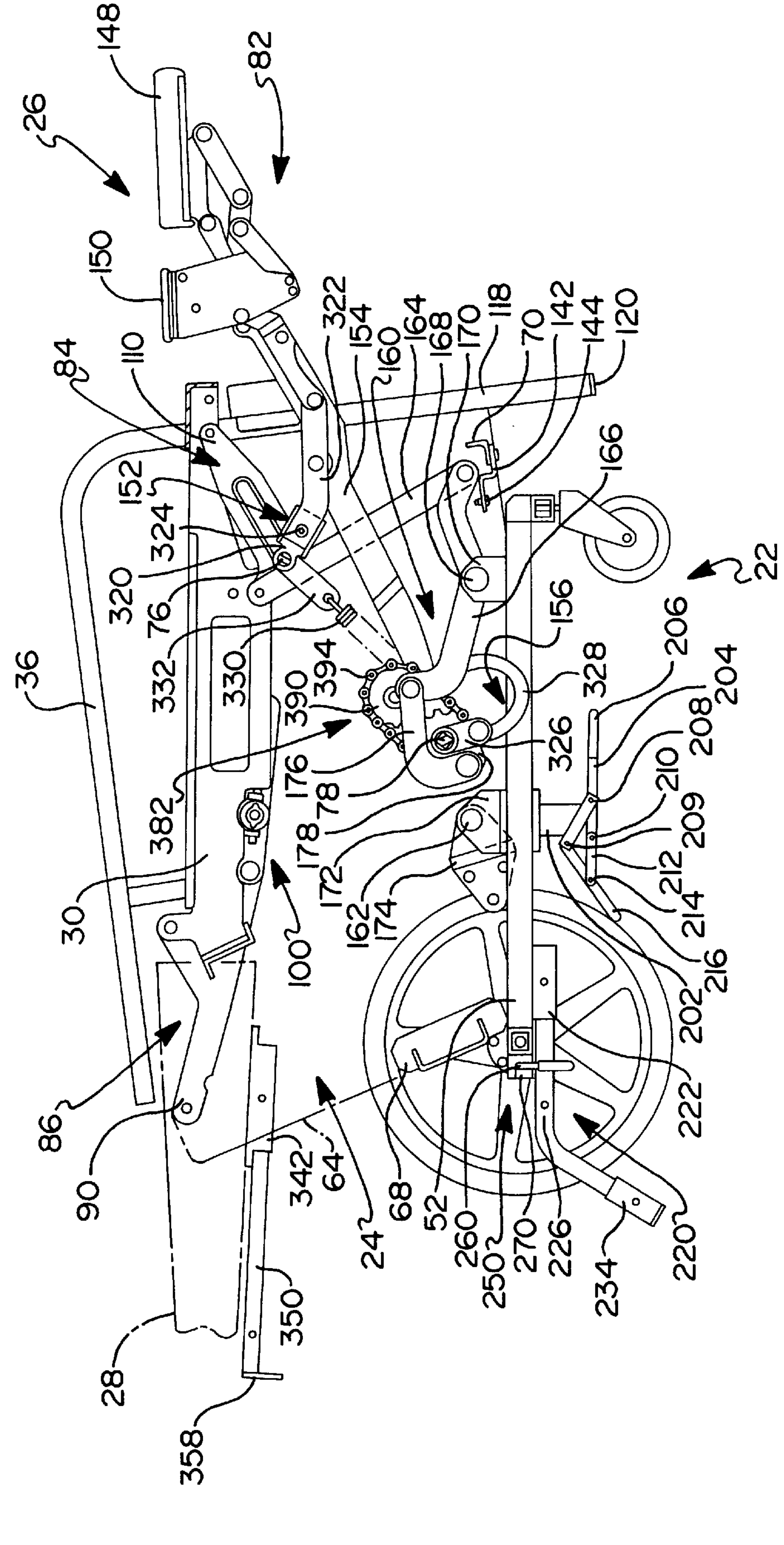
FIG. 8 is a simplified sectional view similar to FIG. 7, with several of the reinforcing links removed, illustrating the chair frame with the seat back in a fully reclined position and the leg rest assembly extended such that the chair frame is tilted by the tilt linkage assembly.

Referring back to FIGS. 3 and 6 through 8, mobile base assembly 22 is illustrated having left and right hand brake assemblies 46 mounted to the lower surface of each mobile base side rail 52, and which engage each rear wheel 42. It should be noted that each left and right hand brake assembly 46 can be independently operated. Each hand brake assembly 46 includes a mounting bracket 202 which is attached to the lower surface of base rail 52 with suitable fasteners, or by welding. Each hand brake assembly 46 comprises a brake handle lever 204 having a rubberized cover 206, and a toggle link 212, which is secured at its mid-portion to mounting bracket 202 at pivot 208. A stop lever 216 having an engaging end 218 is also secured at its top portion to mounting bracket 202 at pivot 209. The toggle link 212 is secured between the lower end of brake handle lever 204 at pivot 210 and a mid-portion of the stop lever 216 at pivot 214. The hand brake assembly 46 operates in an over center relationship such that forward and downward movement of the brake handle lever 204 forces the engaging end 218 of stop lever 216 to engage the rear rubber wheel portion 184, thus locking rear wheel 42. Continued movement of the brake handle lever 204 forces the pivot 210 between brake handle lever 204 and toggle link 212 over center, and thus the hand brake assembly 46 is maintained in a locked position. Upward and rearward movement of brake handle lever 204 acts to disengage stop lever 216 from rear wheel 42. FIG. 7 illustrates hand brake assembly 46 in the disengaged position, and FIG. 8 illustrates the brake assembly 46 in the engaged position.

Figure 19:
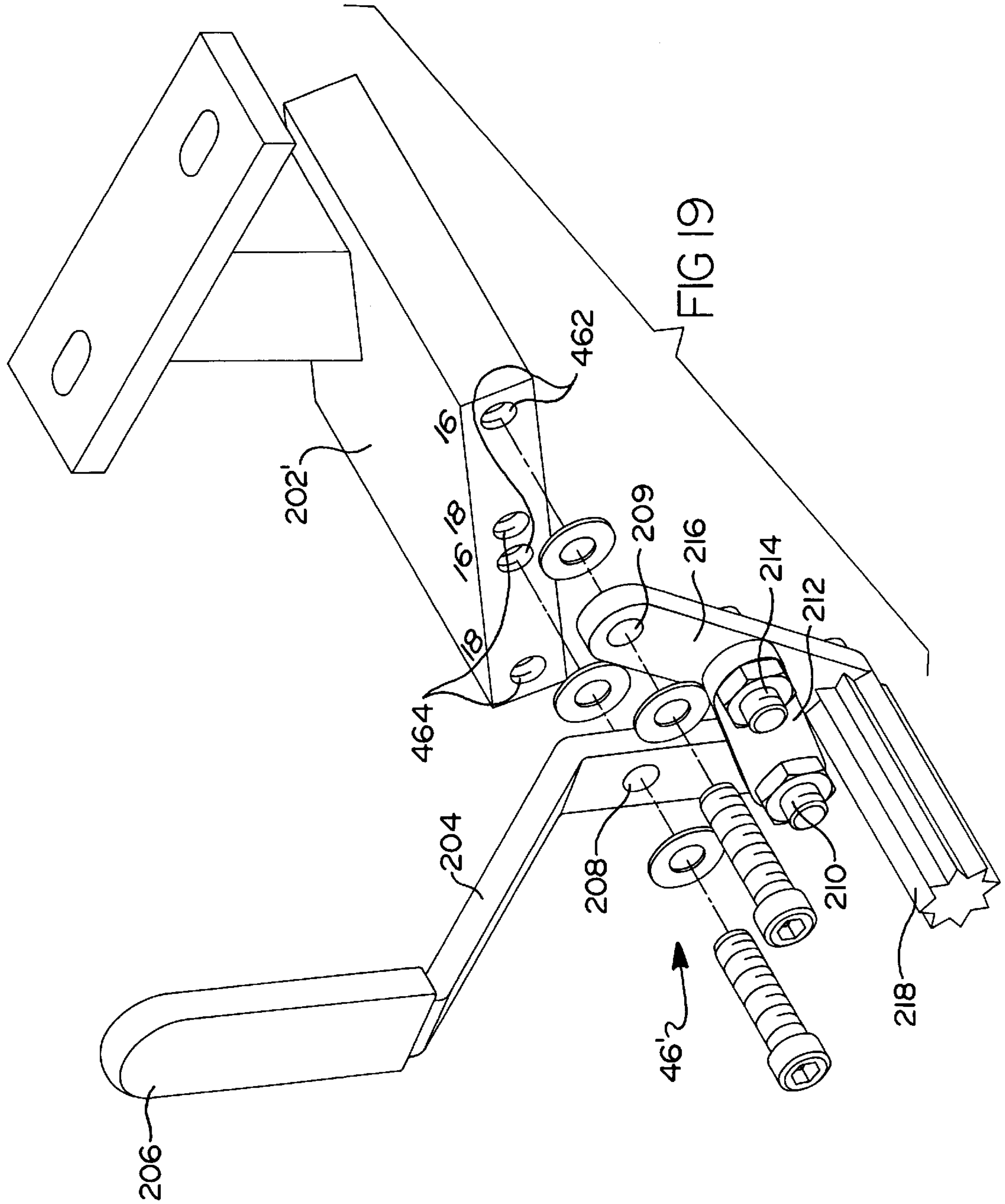
FIG. 19 is a perspective view of the improved hand brake mounting bracket also in accordance with the alternative preferred embodiment of the present invention.

With reference to FIG. 19, the hand brake assembly 46' and mounting bracket 202' associated with the alternate preferred embodiment of the present invention are disclosed. The alternate embodiment for mounting bracket 202' includes a first pair of apertures 462 and a second pair of apertures 464. Mounting bracket 202' is also shown to include the markings 16 and 18 which denote that the components of hand brake assembly 46' should be secured within apertures 462 when chair 20 is outfitted with the smaller 16 inch rear wheels 42, and should be secured within second apertures 464 when chair 20 is outfitted with the larger 18 inch rear wheels 42'. The second set of apertures 464 accommodate the additional one inch larger radius associated with 18 inch rear wheels 42'. Accordingly, it will be appreciated by one skilled in the art that when the proper set of apertures 462, 464 are selected for securing the components of each hand brake assembly 46', that each left and right hand brake assembly 46' operates in a substantially similar manner as hand brake assembly 46 described above.

Referring now to FIG. 5, seat 30 and swing linkage mechanism 86 of the present invention illustrate the range of reclining motion achieved between seat back 28 and seat 30. As presently preferred, seat 30 is of the type disclosed in U.S. Ser. No. 08/319,672 entitled "Recliner Chair Seat Assembly And Method Of Upholstering" filed on Oct. 12, 1994, the disclosure of which is hereby expressly incorporated by reference, and which is commonly owned by the Assignee of the present invention. Metal seat frame 30 is well suited for use in the health care environment in that a seat cushion (not shown) can be quickly and easily replaced should it become damaged or soiled during use. One skilled in the art will appreciate that the metal seat frame 30 associated with the present invention allows the seat cushion to be quickly attached and removed using J-strips attached to the front and rear portions of the seat cushion. Preferably, the seat cushion of the present invention is covered in a stain and soil resistant fabric such as vinyl or plastic. Furthermore, metal seat 30 is readily adaptable to a wide range of cushion thicknesses which permit a wide range of seat heights to be accommodated. More particularly, metal seat 30 includes upper and lower mounting apertures 114, 116 for selectively adjusting the appropriate height of the attached seat cushion. This is particularly advantageous in the health care environment where a relatively high seat height is desirable to facilitate the entering and exiting of the wheeled reclining chair 20.

With continued reference to FIG. 5, seat 30 is supported at a forward portion by support shaft 76, and at a rearward portion by the connection of rear attachment link 88 to the inner surface of each side frame panel 64. More particularly, the side rails of seat 30 are adapted to receive front slide assembly 84 which includes front slide bracket 110 having lost motion slot 112 formed therein for guiding the fore and aft motion of seat 30 on support shaft 76. Lost motion slot 112 is of sufficient length to permit a full range of travel for seat 30 during reclining motion thereof and accordingly does not function as a mechanical stop. It should be particularly noted that front slide bracket 110 is articulated at a relatively steep angle of inclination which provides additional height to seat 30 when seat back 28 is fully reclined. Rear swing link mechanism 86 includes rear attachment link 88 secured to side frame panel 64, and rear swing link 90 pivotally connected to the top portion of attachment link 88 at pivot 94. An upstanding post 96 formed on the rear portion of seat 30 is pivotally connected at pivot 98 to rear swing link 90. In addition, rear swing link 90 is operably connected to seat 30 through rear slide mechanism 100 at pivot 102. As best seen in FIG. 2, seat back 28 is releasably secured to an upstanding portion 92 of rear swing link 90 via locking slide bracket 87.

The geometry of rear swing link 90 permits seat back 28 to be reclined into a substantially flat position relative to seat 30. More specifically, as seat back 28 is reclined relative to seat 30, rear swing link 90 rotates about pivot 94, causing the rear portion of seat 30 to move forwardly and upwardly about an arcuate path defined by pivot 94 (shown in FIG. 5 as $A_1$). As seat 30 moves upwardly and forwardly, front slide brackets 110 slide upwardly and forwardly along support shaft 76. Slide brackets 110 are designed to allow extension or retraction of pantograph linkage assembly 82 when the wheeled chair 20 is placed in its deep recline position, which promotes ease of use by the seat occupant or by the caregiver. In order for the seat assembly to achieve a substantially flat position, the geometry of rear swing link 90 must be such to allow pivot 98 to achieve an over center condition relative to a line drawn between pivot 94 and front support shaft 76. Furthermore, the kinematics of the swing linkage mechanisms 86 are such that the arc $A_1$ is tangential with, or in the alternative, does not intersect with an arc drawn about the centerline of support shaft 76 through pivot 96 (shown in FIG. 5 as $A_2$) when the seat assembly is in the fully reclined position. In this manner, swing linkage mechanisms 86 function as a sliding-linkage mechanism to permit a full range of motion of seat 30 relative to rear swing link 90.

Rear slide mechanism 100 is operably coupled between rear swing link 90 and seat 30 to define a deep recline limit of the reclining movement of the seat assembly. More specifically, slide member 104 is pivotally coupled to a lower end of rear swing link 90 at pivot 102 and has an elongated slot 106 formed therein. Retainer 108 disposed within the slot 106 is secured to seat 30 such that slide member 104 reciprocates relative thereto. Preferably, retainer 108 is a short bolt secured by a wing nut. When seat back 28 reaches the deep reclined position, retainer 108 engages the rear portion of slot 106 to provide a positive mechanical stop, thus limiting further reclining motion of seat back 28 relative to seat 30. In addition, rear slide mechanism 100 may be adapted to provide an adjustable frictional resistance to reclining movement of seat back 28 relative to seat 30. The upright limit of reclining movement of the seat assembly is defined by the engagement of a rearward edge of rear swing link 90 with rear cross frame member 68 as best seen in FIG. 6.

Figure 6:
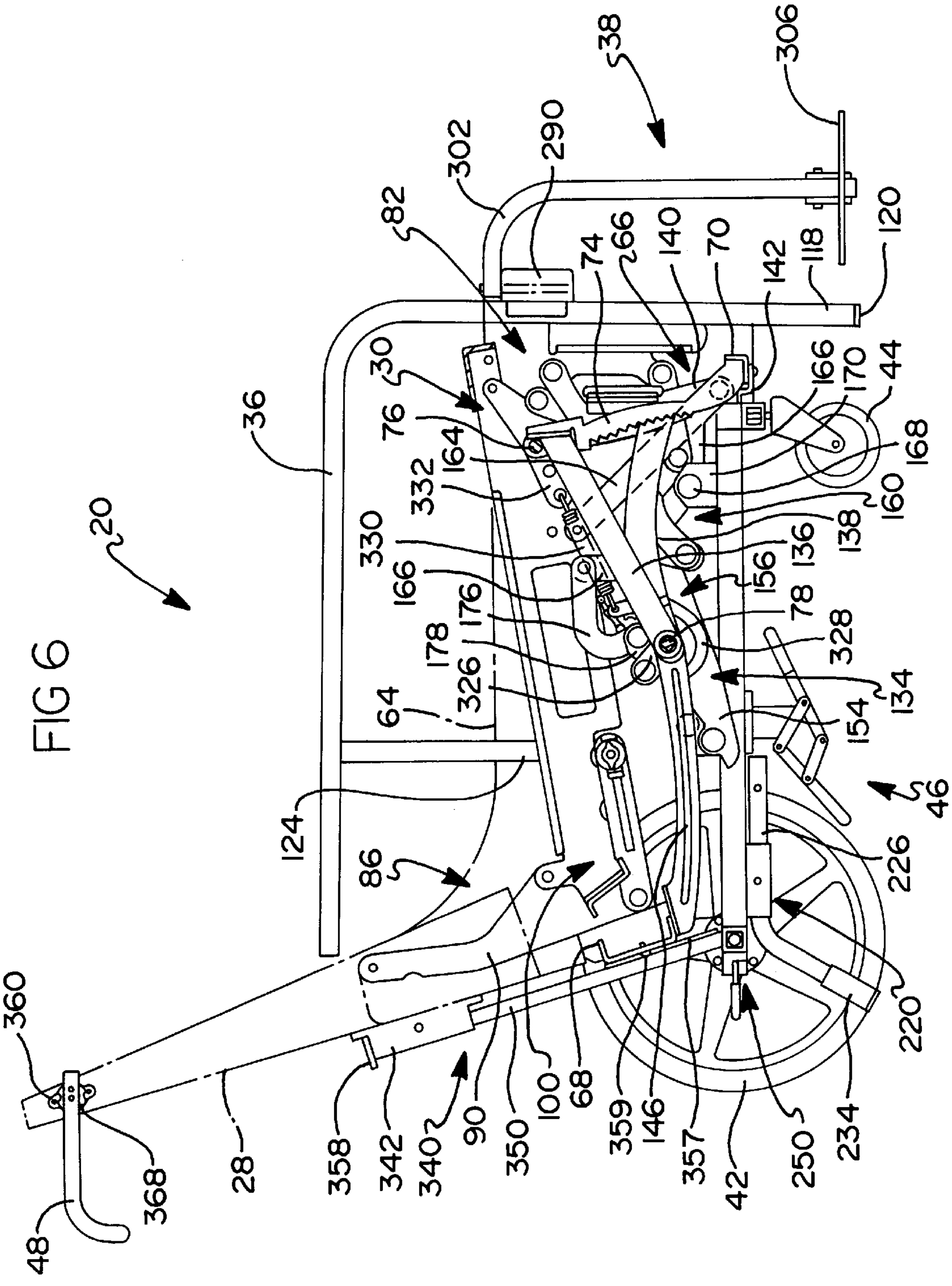
FIG. 6 is a sectional side view illustrating additional components of the present invention including the reinforcement bracing for interconnecting the front and rear cross members of the chair frame assembly with the actuation mechanism, the leg rest assembly and the secondary tilt linkage mechanism, wherein the seat back is in the upright position and the leg rest assembly is in the retracted position such that the chair frame is not tilted relative to the mobile base assembly.

With continued reference to FIG. 6, wheeled chair 20 is illustrated with seat back 28 in the upright position and leg rest assembly 26 retracted. FIG. 6 also illustrates the reinforcement bracing associated with the chair frame 24 and drive rod 78. Reinforcement bracing 134 is interconnected between drive rod 78 and front and rear cross members 66, 68 and includes a pair of laterally spaced front and rear drive shaft supports which are journally connected to drive rod 78 and extend forwardly to front cross member 68 and rearwardly to rear cross member 68. More specifically, a single upper front drive rod support 136 is journally connected to drive rod 78 at a rear end thereof and extends to a top portion of central segment or central support bracket 74 and is secured thereto just below front support shaft 76. A pair of lower front drive rod supports 138 are also journally connected to drive rod 78 at a rear end thereof and are rigidly secured to a middle portion of corresponding front support arms 140, while each front support arm 140 extends between a top portion of support shaft 76 and front cross member segment 70. In addition, reinforcement bracing 134 includes a pair of rear drive shaft supports 146 having a forward end journally connected to drive rod 76 and a reward end rigidly secured to a lower flange of rear cross member 68. In this manner, reinforcement bracing 134 ties front and rear cross frame members 66, 68 with drive rod 78 to further strengthen and stiffen chair frame assembly 24. A more detailed description of the components of reinforcement bracing 134 can be found in U.S. application Ser. No. 08/552,614 entitled “Linear Actuation Drive Mechanism For Power-Assisted Chairs” filed on Nov. 3, 1995 which is commonly owned by the assignee of the present invention and the disclosure of which is expressly incorporated by reference herein.

With reference to FIGS. 7 and 8, leg rest assembly 26 of wheeled chair 20 is illustrated and includes pantograph linkage 82 having leg rest board 148 and ottoman board 150 secured to a portion thereof. Pantograph linkage 82 is journally supported from front support shaft 76 by a curved two-piece swing link 152 and operably coupled to drive rod 78 through long support link 154. Two-piece swing link 152 (FIG. 8) includes swing bracket 320 which is journally supported from front support shaft 76, and support link 322 which is pivotally connected to pantograph linkage 82. Swing bracket 320 and support link 322 each have complementary apertures formed therein to facilitate the securement of support link 322 to swing bracket 320 using a suitable fastener 324. A more detailed description of the components of two-piece swing link 152 can be found in U.S. application Ser. No. 08/729,531 entitled “Modular Reclining Chair Having Improved Chair Frame and Pantograph Linkage” filed Oct. 11, 1996 which is commonly owned by the assignee of the present invention and the disclosure of which is expressly incorporated by reference herein. Accordingly, two-piece swing link 152 allows pantograph linkage 82 to be replaced in the field without disassembling the chair frame 24, should any of the links within pantograph linkage 82 become damaged.

As presently preferred, long support link 154 is designed to transfer very heavy loads resulting from a person leaning or sitting on leg rest board 148 or ottoman board 150 through pantograph linkage 82 into drive rod 78. These heavy loads are transferred into chair frame assembly 24 by reinforcement bracing 134 which prevents undesirable deformation of drive rod 78. A reinforcing link 158 (FIG. 2) is secured to long support link 154 at three separate locations using three spacers placed therebetween and suitable fasteners (not shown). Thus, reinforcing link 158 serves to prevent these heavy loads from deforming long support link 154, as well as the other links associated with pantograph linkage assembly 82.

Referring briefly to FIGS. 2A and 10, pantograph linkage assembly 82 (and leg rest assembly 26) is positionable from a retracted position as shown in FIG. 6 into an extended position as shown in FIGS. 7 and 8 through the manipulation of drive rod 78 via actuation handle 80 and chain drive assembly 382. Actuation handle 80 is secured to the outboard end of top pivot 386 of chain drive bracket 384 and is operably coupled to drive rod 78 via first and second sprockets 390, 392 and drive chain 394. First sprocket 390 is journally secured to top pivot 386, and second sprocket 392 is journally secured to bottom pivot 388, and is rigidly mounted to drive rod 78. Accordingly, movement of actuation handle 80 causes a corresponding rotational movement of drive rod 78 via chain drive assembly 382.

As best illustrated in FIG. 8, leg rest assembly 26 further includes a spring-assist over center mechanism 156 which cooperates with pantograph linkage 82 to facilitate extension and retraction of leg rest assembly 26. As best viewed in FIGS. 6 and 8, spring-assist over center mechanism 156 includes a small drive link 326 rigidly connected to drive rod 78 at a first end, and pivotally connected to a C-shaped toggle link 328 at a second end. C-shaped toggle link 328 is operatively connected to front support shaft 76 via an over center spring 330 which connects between C-shaped toggle link 328 and spring link 332 which is journally supported from front support shaft 76. Accordingly, spring-assist over center mechanism 156 biases drive rod 78 in a first direction when leg rest assembly 26 is extended, and biases drive rod 78 is a second direction when leg rest assembly 26 is retracted.

Leg rest board 148 is readily adaptable to receive various upholstering and/or cushions to match the cushion thickness and seat height utilized with seat 30 for placing a seated occupant in a comfortable position when leg rest assembly 26 is in the extended position. In contrast, ottoman panel 150 is stowed behind leg rest board 148 when leg rest assembly 26 is in the retracted position (FIG. 6), and thus is not readily adaptable to receive various upholstering and/or cushion thickness. However, the height adjustment of ottoman board 150 may be accommodated with an ottoman linkage having a selectable height feature. A presently preferred leg rest assembly is disclosed in U.S. application Ser. No. 08/659,798 entitled "Dual Leg Rest Assembly Having Selectable Height Ottoman" filed on Jun. 7, 1996 which is commonly owned by the assignee of the present invention, and the disclosure of which is expressly incorporated herein by reference.

With continued reference to FIGS. 6 through 8, tilt linkage assembly 160 is interconnected between mobile base side rail 52 and seat 30 for tilting chair frame assembly 24 relative to mobile base assembly 22, i.e., rotating chair frame assembly 24 about main pivot point 162. While the components of tilt linkage assembly 160 are generally illustrated in FIGS. 6 through 8, various elements of chair frame 24 and reinforcement bracing 134 have been left out of FIG. 8 to highlight the links comprising tilt linkage assembly 160. One skilled in the art will appreciate that wheeled chair 20 includes left and right tilt linkage assemblies 160 which form mirror images on each side of the chair frame 24. Tilt linkage assembly 160 further includes main pivot bracket 172 attached to a mid-portion of each base side rail 52, and main pivot mount 174 secured to the lower inside surface of inner side panel 64 for pivotally connecting chair frame assembly 24 to side rail 52 of mobile base assembly 22.

Additionally tilt linkage assembly 160 is operably coupled to front slide assembly 84 for causing tilting movement in response to reclining movement of seat back 28 relative to seat 30. As best viewed in FIG. 8, tilt linkage assembly 160 includes a generally straight lift link 164 pivotally connected to the rear end of front slide bracket 110 at an upper end thereof and pivotally connected to tilt control lever 166 at a lower end thereof. Tilt linkage assembly 160 is also operably coupled to drive rod 78 for causing tilting movement in response to rotation thereof. As disclosed, tilt control lever 166 is pivotally connected at pivot point 168 intermediate the first and second ends thereof to front pivot bracket 170 which is secured to a front portion of mobile base side rails 52. The second end of tilt control lever 166 is operably coupled to drive rod 78 through J-shaped connector link 176 and tilt linkage drive link 178 such that rotation of drive rod 78 causes tilting movement of chair frame assembly 24. Tilt linkage drive link 178 is generally U-shaped, with each of its upstanding tabs connected to drive rod 78 for additional load bearing strength.

Referring to FIG. 6, reclining chair 20 is illustrated in a non-tilted, non-reclined position such that seat 30 is supported by front support shaft 76 and by rear swing linkage mechanisms 86. Referring now to FIGS. 7 and 8, tilting movement of chair frame 24 relative to base assembly 22 is induced as seat back 28 is reclined with respect to seat 30. Lift link 164 rotates about its pivotal connection with tilt control link 166 in a clockwise direction to urge the front of chair frame assembly 24 upward so as to tilt about main pivot point 162. With particular reference to FIG. 8, additional tilting of the chair frame assembly 24 can be achieved by rotation of drive rod 78 via actuation handle 80 in a counterclockwise direction which rotates tilt control lever 166 in a counterclockwise direction about pivot 168 of front pivot bracket 170 to urge lift link 164 in an upwardly direction, thereby further tilting chair frame assembly 24 relative to mobile base assembly 22. Tilt linkage mechanism 160 is further described in U.S. application Ser. No. 08/533,829 entitled "Glider Chair" filed on Oct. 18, 1995 which is commonly owned by the assignee of the present invention and the disclosure of which is expressly incorporated herein by reference.

The total tilting movement effectuated by reclining seat back 28 and actuating drive rod 78 is the sum of the tilting movements achieved by each independent tilting movement heretofore described. As presently preferred, the tilting movement of chair frame assembly 24 effectuated by rotation of drive rod 78 is approximately 6° (FIG. 7), and the tilting movement of chair frame assembly 24 effectuated by reclining of seat back 28 is approximately 3° (FIG. 8). Accordingly, tilt linkage assembly 160 enables wheeled chair 20 to be independently and cumulatively tilted a total of approximately 9°. Thus, as best seen in FIG. 8, actuation of tilt linkage assembly 160, in combination with deep recline swing linkage mechanism 86 and front slide assembly 84, enables a seated occupant to be laid in a substantially flat position parallel with the floor, and thus allows wheeled chair 20 to be used as both a wheel chair and a gurney when the leg rest assembly 26 is fully extended.

Referring now to FIG. 9A, the recline lockout feature associated with wheeled chair 20 is described in more detail. Recline lockout assembly 340 includes a slide tube 342 which is welded to a mounting plate 344. Mounting plate 344 is secured to the rear edge of seat back 28 using suitable fasteners. Slide tube 342 is a square aluminum tube having inside dimensions sized for receiving recline lockout post 350, formed from square aluminum stock. The top of recline lockout post 350 includes a rearwardly extending flange 358 which can be used for raising and lowering the recline lockout post 350. The bottom end 356 of recline lockout post 350 is mitered at approximately a 70° angle to provide maximum surface contact between bottom end 356 and rear cross member 58 of base assembly 22.

Additionally, recline lockout post 350 has upper and lower apertures 352, 354 formed therein. Likewise, slide tube 342 also has an aperture 346 formed therethrough. A ball release pin 348 having a key ring at one end is placed through aperture 346, and through either upper aperture 352 for retaining recline lockout post 350 in an upper disengaged position, or through lower aperture 354 for retaining recline lockout post 350 in a lower engaged position. Thus, when recline lockout post 350 is locked into the upper position, seat back 28 is free to recline with respect to base assembly 22. However, when recline lockout post 350 is locked into the lower engaged position, seat back 28 is prevented from reclining relative to base assembly 22 because the bottom end 356 of recline lockout post 350 is rigidly engaged with rear cross member 58. Additionally, recline lockout post 350 is supported by rear chair frame cross member 68 through a steel button 359 which engages recline lockout post 350 to prevent abrasion or other damage to the upholstered tailgate 357 secured to rear cross member 68. As disclosed, steel button 359 is a truss-headed screw which is secured into rear chair frame cross member 68. The recline lockout mechanism 340 is especially useful when transporting a seat occupant in areas where common obstacles such as doorway thresholds exist. As such, the front end of wheeled chair 20 can be slightly tipped by applying appropriate downward force to push handles 48 which will raise the front casters 44 so that the wheeled chair 20 can be pushed over the obstacle. When recline lockout mechanism 340 is locked into the upper disengaged position, a downward force placed upon push handles 48 would cause seat back 28 to recline, which is generally undesirable during the transportation of the seat occupant. Alternatively, a care giver may wish to engage recline lockout mechanism 340 to prevent the seat occupant from reclining seat back 28 due to a particular treatment being administered to the seat occupant, or for other reasons.

With reference to FIGS. 12A–12B and 1A–1D, the push handles associated with the present invention are illustrated in their three operative positions. Preferably, wheeled chair 20 is outfitted with curved push handles 48. A handle mounting bracket 360 is secured to the upright frame members of seat back 28. As best seen in FIGS. 12A–12B, handle mounting bracket 360 includes two mounting apertures 362 for securing each handle mounting bracket 360, four locking pin apertures 364*a*, 364*b*, 364*c*, 364*d* which are used to retain curved push handles 48 in four distinct positions, and a threaded aperture 366 for receiving a shoulder bolt 372. The forward portion of each curved push handle 48 includes a pivot plate 368 welded thereto. Pivot plate 368 is provided with a centrally located pivot aperture 374, for receiving shoulder bolt 372 for pivotally securing pivot plate 368 to mounting bracket 360, and locking pin aperture 376 for retaining spring assist locking pin 370. As disclosed, locking pin 370 is biased into a locked position for engaging one of the four locking pin apertures 364*a*, 364*b*, 364*c*, 364*d* by a compression spring (not shown). Additionally, spring assist locking pin 370 includes a spherical bulb (not shown) which allows the locking pin to be grasped more easily when retracting the locking pin to permit rotation of curved handle 48. In operation, each curved push handle 48 can be independently rotated and locked into one of four operative positions. Curved push handle 48 can be locked into a rear facing position (FIG. 1A) when locking pin 370 engages locking pin aperture 364*a*, which is the optimal position for pushing wheeled chair 20 when the seat back 28 is in the upright position. Curved push handles 48 are locked into their upright position (FIGS. 1C, 1D) by engaging each locking pin 370 into each locking pin aperture 364*b*. This upright position allows wheeled chair 20 to be pushed and/or maneuvered when seat back 28 is in the reclined or gurney position. As part of the alternative preferred embodiment, curved push handle 48 can be locked into an upward position (FIGS. 12B and 1E) when locking pin 370 engages locking pin aperture 364*d*, which is the optimal position for pushing wheeled chair 20 when the seat back 28 is in the partially reclined position. It may also be desirable to lock curved push handles 48 into their stored position (FIGS. 1C, 1D) by engaging each locking pin 370 into each locking pin aperture 364*c*. Thus, with curved push handles 48 locked into their stored position, the seat back 28 of wheeled chair 20 may be placed into close proximity to a wall. Accordingly, one skilled in the art will readily appreciate the flexibility and benefits provided by the adjustable rotating feature of curved push handles 48.

Alternatively, wheeled chair 20 can be equipped with straight push handles 50 which are permanently secured into a rear facing position. According to this alternate embodiment, straight push handles 50 are fixed to handle bracket 360, and cannot be rotated between various positions. As best illustrated by FIG. 12, the end portion of straight push handle 50 is defined by the phantom lines which define an end cap 378. Straight push handles 50 also include aperture 374 for permanently securing the straight handle 50 to handle mounting bracket 360 with the same shoulder bolt 372. However, aperture 376 is provided with a fixed locking pin 380 designed to permanently engage locking pin aperture 364*a*. As disclosed, fixed locking pin 380 extends from both sides of straight handle 50 (not shown), which allows straight handle 50 to be manufactured as a universal part for use on both sides of seat back 28. Accordingly, when each shoulder bolt 372 is secured into threaded apertures 366, and each fixed locking pin 380 engages locking pin apertures 364*a*, straight push handles 50 are rigidly secured into their rear facing position. This alternate embodiment of straight push handle 50 provides an economical push handle which functionally serves to assist in maneuvering wheeled chair 20 during the transportation of a seat occupant. However, a wheeled chair 20 purchased with straight push handles 50 could easily be upgraded with curved push handles 48 because of the flexibility provided by handle mounting bracket 360.

Figure 13:
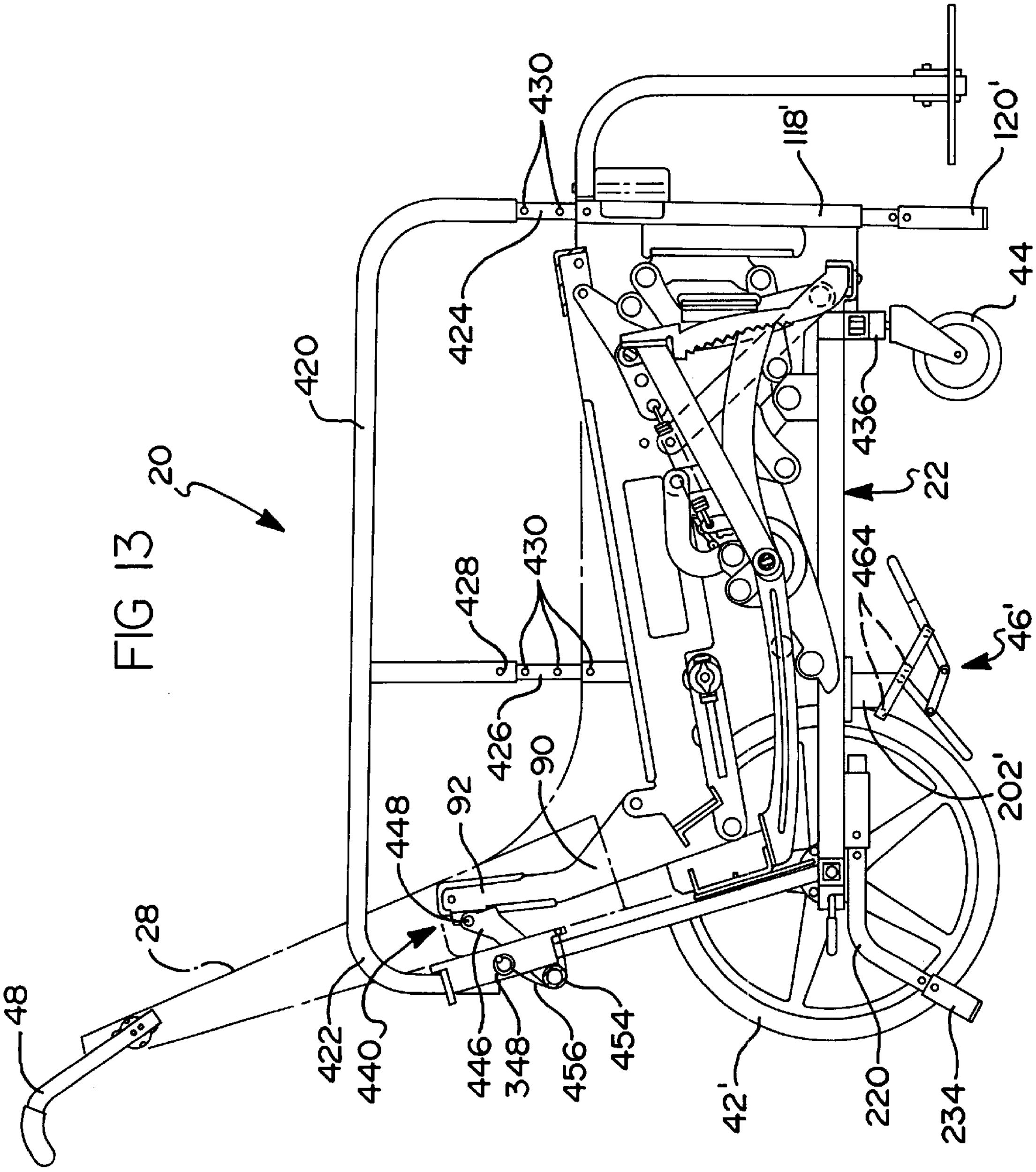
FIG. 13 is a sectional side view illustrating the improved components of the present invention including the larger rear wheels, adjustable arm rests and lockable seat slide assembly in accordance with the alternate preferred embodiment of the present invention.

Referring now to FIG. 13, many of the improvements associated with the alternative preferred embodiment of the present invention are shown and described in more detail. As clearly shown, the alternate embodiment of wheeled chair 20 includes the larger 18 inch rear wheels 42' along with several of the improvements designed to accommodate the larger rear wheels 42'. More specifically, spacer sleeve 436 is positioned between removable front casters 44 and mobile base assembly 22. Additionally, the adjustable foot portion 120' is illustrated as being secured to forward anti-tip post 118' in the lower position. Additionally, the rear adjustable foot tube 234 associated with rear anti-tip bar assembly 220 is also secured in its lower position. The components forming hand brake assembly 46' are shown as being mounted in second apertures 464 of mounting bracket 202' for accommodating the larger 18 inch rear wheels 42'. The adjustable arm rest 420 is secured in the highest of its three raised positions. Also as part of this alternate preferred embodiment, locking slide bracket assembly 440 is shown in the downward and locked position as described above. Finally, the rear push handle 48 is shown in the fourth upright and rearward facing position. Accordingly, one skilled in the art will appreciate that these improvements associated with the alternate preferred embodiment of wheeled chair 20 significantly increase the functionality and maneuverability of wheeled chair 20.

Figure 16:
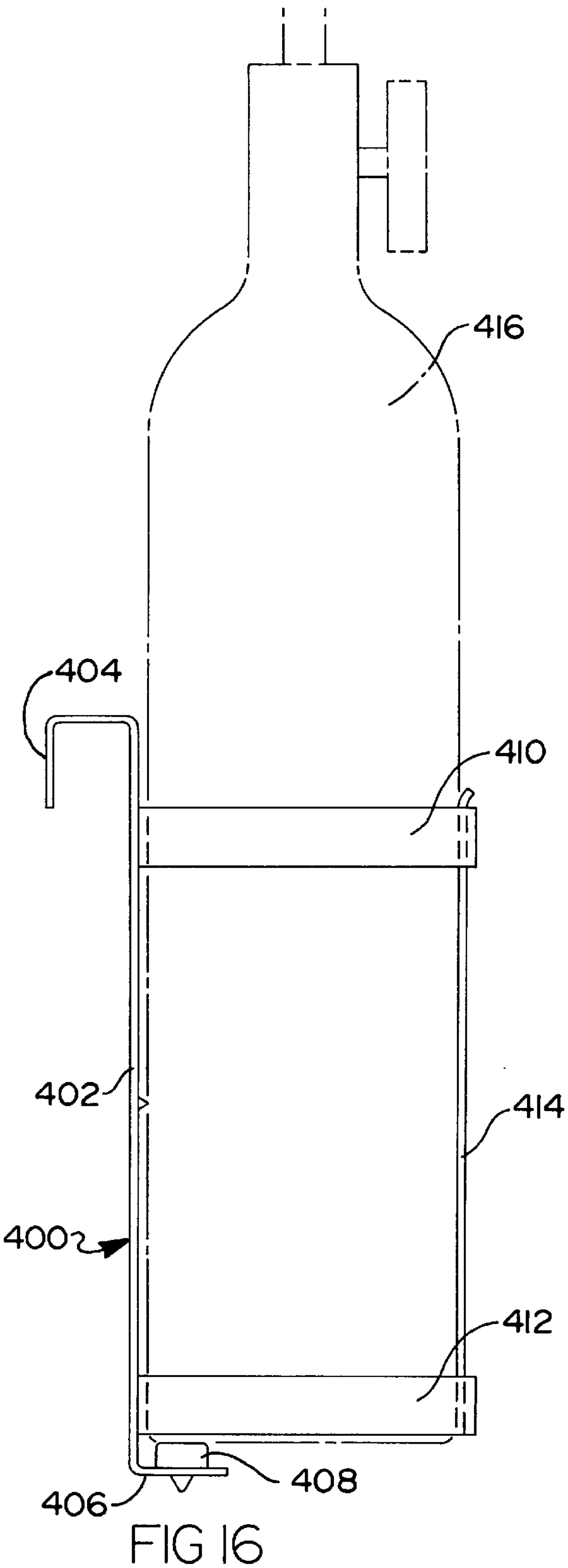
FIG. 16 is a side elevation view of the oxygen bottle support assembly also in accordance with the alternate preferred embodiment of the present invention.
Figure 18:
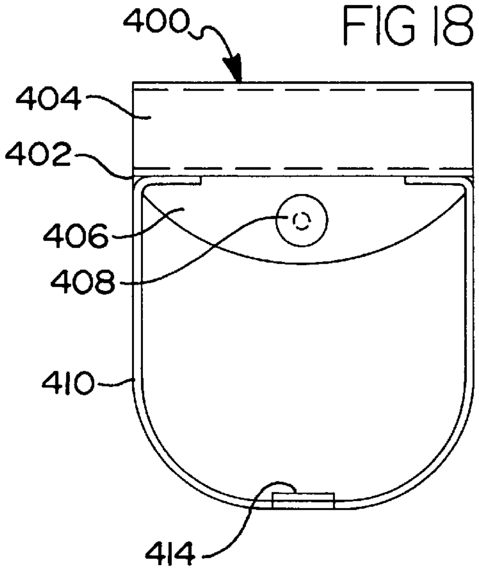
FIG. 18 is a top plan view of the oxygen bottle support assembly of FIG. 16.
Figure 17:
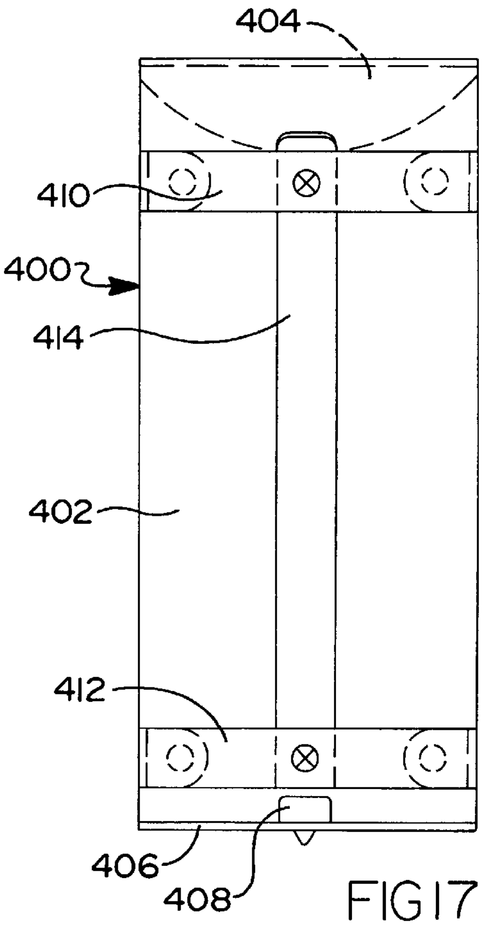
FIG. 17 is a front elevation view of the oxygen bottle support assembly shown in FIG. 16 with the oxygen bottle removed.

With reference to FIGS. 16–18, the features and details associated with oxygen bottle support bracket 400 are shown in more detail. As best illustrated in FIG. 16, oxygen bottle support bracket 400 includes an intermediate portion 402, an inverted J shaped portion 404 at its top portion, and an L-shaped support flange 406 at its lower portion. Oxygen bottle support bracket 400 is designed so that upper portion 404 can be easily and quickly engaged or disengaged with the top edge of side frame panel 64. A support stopper 408 is secured to support flange 406 for supporting an oxygen bottle 416 within the support bracket 400. Preferably, support stopper 408 is a soft plastic or rubber material. An upper bottle retainer 410 and a lower bottle retainer 412 are welded to the surface of intermediate portion 402. A bottle guide 414 is secured, preferably by welding between the upper and lower bottle retainers 410, 412. Accordingly, oxygen bottle support bracket 400 allows an oxygen bottle 416 to be transported along with wheeled health care chair 20 for assisting in the health care of the occupant.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A reclining chair comprising:

a base assembly;

wheel means for supporting said base assembly;

a chair frame pivotally supported on said base assembly;

a rotatable drive shaft extending transversely between opposite side portions of said chair frame;

a leg rest assembly supported from said chair frame and operatively coupled to said drive shaft for movement from a retracted position to an extended position in response to rotation of said drive shaft in a first direction;

a seat assembly having a seat member, a seat back and swing link means for pivotally interconnecting said seat back and said seat member to said chair frame for reclining between an upright position and a reclined position;

a tilt linkage assembly operably interconnecting said chair frame to said base assembly for providing tilting movement therebetween;

at least one arm rest assembly releasably secured to said chair frame, said arm rest assembly including means for selecting the vertical position of said arm rest assembly;

whereby said swing link means is positionable into a deep recline position such that said seat back achieves a substantially flat position relative to said seat member.

2. The reclining chair of claim 1 including a locking slide bracket assembly for retaining said seat back in locked engagement with said swing link means.

3. The reclining chair of claim 1 wherein said swing link means includes a pivotal connection between a swing link and said seat member which achieves an over-center condition with respect to a support shaft and said pivotal connection between said swing link and said chair frame.

4. The reclining chair of claim 1 including a support bracket assembly for supporting an oxygen bottle.

5. The reclining chair of claim 1 wherein said tilt linkage assembly includes means for imparting a first tilt angle between said chair frame and said base assembly in response to rotational movement of said drive shaft.

6. The reclining chair of claim 5 wherein said tilt linkage assembly includes means for imparting a second tilt angle between said chair frame and said base assembly in response to reclining movement of said seat back.

7. The reclining chair of claim 1 wherein said tilt linkage assembly comprises a lift link pivotally connected at a first end to said seat member and pivotally connected to said base assembly at a second end, such that reclining movement of said seat assembly rotates said lift link to urge a forward portion of said seat member upwardly thereby tilting said chair frame relative to said base assembly.

8. The reclining chair of claim 1 wherein said tilt linkage assembly further comprises:

a lift link pivotally connected at a first end to said seat member and operably coupled to said base assembly at a second end;

a main pivot assembly pivotally coupling said chair frame to said base assembly;

a tilt control lever having a first end pivotally connected to said lift link and a second end operably coupled to said drive shaft for selectively rotating said tilt control lever, said tilt control lever being pivotally supported from said base assembly such that rotation of said tilt control lever urges said lift link upwardly to tilt said chair frame about said main pivot assembly.

9. The reclining chair of claim 1 further comprising at least one hand brake mechanism supported from a side rail of said base assembly, said hand brake mechanism including an over-center linkage assembly selectively positionable between an engaged and a non-engaged position for preventing rotational movement of said wheel means;

said hand brake mechanism including a mounting bracket for pivotally supporting said over-center linkage assembly in a first position and a second position.

10. The reclining chair of claim 1 further comprising at least one parking brake mechanism supported from a rear cross member of said base assembly, said parking brake mechanism having a spring biased detent mechanism for engaging an aperture formed in said wheel means.

11. The reclining chair of claim 1 further comprising an anti-tip bar assembly.

12. The reclining chair of claim 1 further comprising removable foot rests.

13. The reclining chair of claim 1 wherein said wheel means includes a pair of front casters and a pair of rear wheels releasably secured to said base assembly.

14. The reclining chair of claim 1 further comprising push handles mounted to an upper portion of said seat back, and wherein said push handles are selectively positionable into one of four operative positions.

15. The reclining chair of claim 1 wherein said at least one arm rest assembly includes an arm rest secured to a first support post and a second support post, wherein at least one of said first and second support posts is pivotally secured to said arm rest.

16. The reclining chair of claim 1 further comprising a chain drive assembly for imparting rotational movement on said drive shaft in response to movement of an actuation handle.

17. The reclining chair of claim 12 further comprising an IV pole mounted to one of said foot rests.

18. A reclining chair comprising:

a base assembly;

a pair of front casters and a pair of rear wheels releasably secured to said base assembly;

a chair frame pivotally supported on said base assembly;

a rotatable drive shaft extending transversely between opposite side portions of said chair frame;

a leg rest assembly supported from said chair frame and operatively coupled to said drive shaft for movement from a retracted position to an extended position in response to rotation of said drive shaft in a first direction;

a seat assembly having a seat member, a seat back and swing link means for pivotally interconnecting said seat back and said seat member to said chair frame for reclining movement between an upright position and a reclined position;

at least one hand brake mechanism supported from a side rail of said base assembly, said hand brake mechanism including an over center linkage assembly selectively positionable between an engaged and a non-engaged position for preventing rotational movement of said rear wheels;

at least one parking brake mechanism supported from a rear cross member of said base assembly, said parking brake mechanism having a spring biased detent mechanism for engaging an aperture formed in at least one of said rear wheels;

at least one arm rest assembly releasably secured to said chair frame, said arm rest assembly including means for selecting the vertical position of said arm rest assembly;

whereby said swing link means is positionable into a deep recline position such that said seat back achieves a substantially flat position relative to said seat member.

19. The reclining chair of claim 18 including a locking slide bracket assembly for retaining said seat back in locked engagement with said swing link means.

20. The reclining chair of claim 18 including a support bracket assembly for supporting an oxygen bottle.

21. The reclining chair of claim 18 further comprising an anti-tip bar assembly for preventing undesired tipping motion of said chair frame and said base assembly.

22. The reclining chair of claim 18 further comprising removable foot rests.

23. The reclining chair of claim 18 further comprising push handles mounted to an upper portion of said seat back, and wherein said push handles are selectively positionable into one of four operative positions.

24. The reclining chair of claim 18 wherein said arm rest assembly comprises an arm rest releasably secured to said chair frame.

25. The reclining chair of claim 18 wherein said seat back further includes a slide bracket for engaging an upstanding portion of said swing link, and wherein said seat back is removably secured to said swing link.

26. A reclining chair comprising:

a base assembly having a pair of anti-tip bars slidingly secured to a rear portion thereof;

a pair of front casters and a pair of rear wheels for supporting said base assembly, each having a quick release mechanism for releasably securing said casters and said wheels to said base assembly;

at least one hand brake mechanism supported from a side rail of said base assembly, said hand brake mechanism including an over center linkage assembly selectively positionable between an engaged and a non-engaged position for preventing rotational movement of said rear wheels, said hand brake mechanism including a mounting bracket for pivotally supporting said over-center linkage assembly in a first position and a second position;

at least one parking brake mechanism supported from a rear cross member of said base assembly, said parking brake mechanism having a spring biased detent mechanism for engaging an aperture formed in at least one of said rear wheels;

a chair frame pivotally supported on said base assembly by a main pivot assembly;

a pair of foot rests supported from said chair frame;

a rotatable drive shaft extending transversely between opposite side portions of said chair frame, said drive shaft being actuated by a handle pivotally coupled to said drive shaft by a chain drive assembly;

a leg rest assembly supported from said chair frame and operatively coupled to said drive shaft for movement from a retracted position to an extended position in response to rotation of said drive shaft in a first direction;

a seat assembly having a seat member, a seat back and a swing link assembly for pivotally interconnecting said seat back and said seat member to said chair frame for reclining movement between an upright position and a reclined position, said swing link assembly being positionable into a deep recline position such that said seat back achieves a substantially flat position relative to said seat member;

said seat back including a locking mechanism selectively positionable between an engaged and a non-engaged position for preventing reclining movement of said seat back when said locking mechanism is in the engaged position;

said seat back including push handles mounted to an upper portion thereof;

at least one arm rest assembly releasably secured to said chair frame, said arm rest assembly including means for selecting the vertical position of said arm rest assembly;

a support bracket assembly for supporting an oxygen bottle; and a tilt linkage assembly operably interconnecting said chair frame to said base assembly for providing tilting movement therebetween.

27. The reclining chair of claim 26 including a locking slide bracket assembly for retaining said seat back in locked engagement with said swing link means.

28. The reclining chair of claim 26 wherein said push handles are selectively positionable into one of four operative positions.

29. The reclining chair of claim 26 wherein said arm rest assembly comprises an arm rest releasably secured to said chair frame.

30. The reclining chair of claim 26 wherein said seat back further includes a slide bracket for engaging an upstanding portion of said swing link assembly, and wherein said seat back is removably secured to said swing link assembly.

31. The reclining chair of claim 26 wherein said tilt linkage assembly further comprises:

a lift link pivotally connected at a first end to said seat member and operably coupled to said base assembly at a second end;

a tilt control lever having a first end pivotally connected to said lift link and a second end operably coupled to said drive shaft for selectively rotating said tilt control lever, said tilt control lever being pivotally supported from said base assembly such that rotation of said tilt control lever urges said lift link upwardly to tilt said chair frame with respect to said base assembly.

32. A reclining chair comprising:

a base assembly;

wheel means for supporting said base assembly;

a chair frame pivotally supported on said base assembly;

a rotatable drive shaft extending transversely between opposite side portions of said chair frame;

a leg rest assembly supported from said chair frame and operatively coupled to said drive shaft for movement from a retracted position to an extended position in response to rotation of said drive shaft in a first direction;

a seat assembly having a seat member, a seat back and swing link means for pivotally interconnecting said seat back and said seat member to said chair frame for reclining between an upright position and a reclined position;

said seat back including a locking mechanism selectively positionable between an engaged and a non-engaged position for independently preventing reclining movement of said seat back when said locking mechanism is in the engaged position; and a tilt linkage assembly operably interconnecting said chair frame to said base assembly for providing tilting movement therebetween;

whereby said swing link means is positionable into a deep recline position such that said seat back achieves a substantially flat position relative to said seat member.

33. The reclining chair of claim 32 wherein said swing link means includes a pivotal connection between a swing link and said seat member which achieves an over-center condition with respect to a support shaft and said pivotal connection between said swing link and said chair frame.

34. The reclining chair of claim 32 wherein said tilt linkage assembly includes means for imparting a first tilt angle between said chair frame and said base assembly in response to rotational movement of said drive shaft.

35. The reclining chair of claim 34 wherein said tilt linkage assembly includes means for imparting a second tilt angle between said chair frame and said base assembly in response to reclining movement of said seat back.

36. The reclining chair of claim 32 wherein said tilt linkage assembly comprises a lift link pivotally connected at a first end to said seat member and pivotally connected to said base assembly at a second end, such that reclining movement of said seat assembly rotates said lift link to urge a forward portion of said seat member upwardly thereby tilting said chair frame relative to said base assembly.

37. The reclining chair of claim 32 wherein said tilt linkage assembly further comprises:

a lift link pivotally connected at a first end to said seat member and operably coupled to said base assembly at a second end;

a main pivot assembly pivotally coupling said chair frame to said base assembly; and a tilt control lever having a first end pivotally connected to said lift link and a second end operably coupled to said drive shaft for selectively rotating said tilt control lever, said tilt control lever being pivotally supported from said base assembly such that rotation of said tilt control lever urges said lift link upwardly to tilt said chair frame about said main pivot assembly.

38. The reclining chair of claim 32 further comprising at least one hand brake mechanism supported from a side rail of said base assembly, said hand brake mechanism including an over-center linkage assembly selectively positionable between an engaged and a non-engaged position for preventing rotational movement of said wheel means.

39. The reclining chair of claim 32 further comprising at least one parking brake mechanism supported from a rear cross member of said base assembly, said parking brake mechanism having a spring biased detent mechanism for engaging an aperture formed in said wheel means.

40. The reclining chair of claim 32 further comprising an anti-tip bar assembly.

41. The reclining chair of claim 32 further comprising removable foot rests.

42. The reclining chair of claim 32 wherein said wheel means includes a pair of front casters and a pair of rear wheels releasably secured to said base assembly.

43. The reclining chair of claim 32 further comprising push handles mounted to an upper portion of said seat back, and wherein said push handles are selectively positionable into one of three operative positions.

44. The reclining chair of claim 32 further comprising at least one arm rest assembly releasably secured to said chair frame.

45. The reclining chair of claim 32 further comprising a chain drive assembly for imparting rotational movement on said drive shaft in response to movement of an actuation handle.

46. The reclining chair of claim 41 further comprising an IV pole mounted to one of said foot rests.

47. A reclining chair comprising:

a base assembly;

a pair of front casters and a pair of rear wheels releasably secured to said base assembly;

a chair frame pivotally supported on said base assembly;

a rotatable drive shaft extending transversely between opposite side portions of said chair frame;

a leg rest assembly supported from said chair frame and operatively coupled to said drive shaft for movement from a retracted position to an extended position in response to rotation of said drive shaft in a first direction;

a seat assembly having a seat member, a seat back and swing link means for pivotally interconnecting said seat back and said seat member to said chair frame for reclining movement between an upright position and a reclined position;

said seat back including a locking mechanism selectively positionable between an engaged and a non-engaged position for preventing reclining movement of said seat back when said locking mechanism is in the engaged position;

a tilt linkage assembly operably interconnecting said chair frame to said base assembly for providing tilting movement therebetween;

at least one hand brake mechanism supported from a side rail of said base assembly, said hand brake mechanism including an over center linkage assembly selectively positionable between an engaged and a non-engaged position for preventing rotational movement of said rear wheels; and at least one parking brake mechanism supported from a rear cross member of said base assembly, said parking brake mechanism having a spring biased detent mechanism for engaging an aperture formed in at least one of said rear wheels;

whereby said swing link means is positionable into a deep recline position such that said seat back achieves a substantially flat position relative to said seat member.

48. The reclining chair of claim 47 further comprising an anti-tip bar assembly for preventing undesired tipping motion of said chair frame and said base assembly.

49. The reclining chair of claim 47 further comprising removable foot rests.

50. The reclining chair of claim 47 further comprising push handles mounted to an upper portion of said seat back, and wherein said push handles are selectively positionable into one of three operative positions.

51. The reclining chair of claim 47 further comprising a pair of arm rests releasably secured to said chair frame.

52. The reclining chair of claim 47 wherein said seat back further includes a slide bracket for engaging an upstanding portion of said swing link, and wherein said seat back is removably secured to said swing link.

53. A reclining chair comprising:

a base assembly having a pair of anti-tip bars slidingly secured to a rear portion thereof;

a pair of front casters and a pair of rear wheels for supporting said base assembly, each having a quick release mechanism for releasably securing said casters and said wheels to said base assembly;

at least one hand brake mechanism supported from a side rail of said base assembly, said hand brake mechanism including an over center linkage assembly selectively positionable between an engaged and a non-engaged position for preventing rotational movement of said rear wheels;

at least one parking brake mechanism supported from a rear cross member of said base assembly, said parking brake mechanism having a spring biased detent mechanism for engaging an aperture formed in at least one of said rear wheels;

a chair frame pivotally supported on said base assembly by a main pivot assembly;

a pair of foot rests supported from said chair frame;

a rotatable drive shaft extending transversely between opposite side portions of said chair frame, said drive shaft being actuated by a handle pivotally coupled to said drive shaft by a chain drive assembly;

a leg rest assembly supported from said chair frame and operatively coupled to said drive shaft for movement from a retracted position to an extended position in response to rotation of said drive shaft in a first direction;

a seat assembly having a seat member, a seat back and a swing link assembly for pivotally interconnecting said seat back and said seat member to said chair frame for reclining movement between an upright position and a reclined position, said swing link assembly being positionable into a deep recline position such that said seat back achieves a substantially flat position relative to said seat member;

said seat back including a locking mechanism selectively positionable between an engaged and a non-engaged position for preventing reclining movement of said seat back when said locking mechanism is in the engaged position;

said seat back including push handles mounted to an upper portion thereof; and a tilt linkage assembly operably interconnecting said chair frame to said base assembly for providing tilting movement therebetween.

54. The reclining chair of claim 53 wherein said push handles are selectively positionable into one of three operative positions.

55. The reclining chair of claim 53 further comprising a pair of arm rests releasably secured to said chair frame.

56. The reclining chair of claim 53 wherein said seat back further includes a slide bracket for engaging an upstanding portion of said swing link assembly, and wherein said seat back is removably secured to said swing link assembly.

57. The reclining chair of claim 53 wherein said tilt linkage assembly further comprises:

a lift link pivotally connected at a first end to said seat member and operably coupled to said base assembly at a second end; and a tilt control lever having a first end pivotally connected to said lift link and a second end operably coupled to said drive shaft for selectively rotating said tilt control lever, said tilt control lever being pivotally supported from said base assembly such that rotation of said tilt control lever urges said lift link upwardly to tilt said chair frame with respect to said base assembly.

58. A reclining chair comprising:

a base assembly;

wheel means for supporting said base assembly;

a chair frame pivotally supported on said base assembly;

a rotatable drive shaft extending transversely between opposite side portions of said chair frame;

a leg rest assembly supported from said chair frame and operatively coupled to said drive shaft for movement from a retracted position to an extended position in response to rotation of said drive shaft in a first direction;

a seat assembly having a seat member, a seat back and swing link means for pivotally interconnecting said seat back and said seat member to said chair frame for reclining between an upright position and a reclined position; and a tilt linkage assembly operably interconnecting said chair frame to said base assembly for providing tilting movement therebetween;

whereby said swing link means is positionable into a deep recline position such that said seat back achieves a substantially flat position relative to said seat member.

59. The reclining chair of claim 58 wherein said seat back includes a locking mechanism selectively positionable between an engaged and a non-engaged position for independently preventing reclining movement of said seat back when said locking mechanism is in the engaged position.

60. The reclining chair of claim 58 wherein said swing link means includes a pivotal connection between a swing link and said seat member which achieves an over-center condition with respect to a support shaft and said pivotal connection between said swing link and said chair frame.

61. The reclining chair of claim 58 wherein said tilt linkage assembly includes means for imparting a first tilt angle between said chair frame and said base assembly in response to rotational movement of said drive shaft.

62. The reclining chair of claim 61 wherein said tilt linkage assembly includes means for imparting a second tilt angle between said chair frame and said base assembly in response to reclining movement of said seat back.

63. The reclining chair of claim 58 wherein said tilt linkage assembly comprises a lift link pivotally connected at a first end to said seat member and pivotally connected to said base assembly at a second end, such that reclining movement of said seat assembly rotates said lift link to urge a forward portion of said seat member upwardly thereby tilting said chair frame relative to said base assembly.

64. The reclining chair of claim 58 wherein said tilt linkage assembly further comprises:

a lift link pivotally connected at a first end to said seat member and operably coupled to said base assembly at a second end;

a main pivot assembly pivotally coupling said chair frame to said base assembly; and a tilt control lever having a first end pivotally connected to said lift link and a second end operably coupled to said drive shaft for selectively rotating said tilt control lever, said tilt control lever being pivotally supported from said base assembly such that rotation of said tilt control lever urges said lift link upwardly to tilt said chair frame about said main pivot assembly.

65. The reclining chair of claim 58 further comprising at least one hand brake mechanism supported from a side rail of said base assembly, said hand brake mechanism including an over-center linkage assembly selectively positionable between an engaged and a non-engaged position for preventing rotational movement of said wheel means.

66. The reclining chair of claim 58 further comprising at least one parking brake mechanism supported from a rear cross member of said base assembly, said parking brake mechanism having a spring biased detent mechanism for engaging an aperture formed in said wheel means.

67. The reclining chair of claim 58 further comprising an anti-tip bar assembly.

68. The reclining chair of claim 58 further comprising removable foot rests.

69. The reclining chair of claim 58 wherein said wheel means includes a pair of front casters and a pair of rear wheels releasably secured to said base assembly.

70. The reclining chair of claim 58 further comprising push handles mounted to an upper portion of said seat back, and wherein said push handles are selectively positionable into one of three operative positions.

71. The reclining chair of claim 58 further comprising at least one arm rest assembly releasably secured to said chair frame.

72. The reclining chair of claim 58 further comprising a chain drive assembly for imparting rotational movement on said drive shaft in response to movement of an actuation handle.

73. The reclining chair of claim 68 further comprising an IV pole mounted to one of said foot rests.

74. A reclining chair comprising:

a base assembly;

a pair of front casters and a pair of rear wheels releasably secured to said base assembly;

a chair frame pivotally supported on said base assembly;

a rotatable drive shaft extending transversely between opposite side portions of said chair frame;

a leg rest assembly supported from said chair frame and operatively coupled to said drive shaft for movement from a retracted position to an extended position in response to rotation of said drive shaft in a first direction;

a seat assembly having a seat member, a seat back and swing link means for pivotally interconnecting said seat back and said seat member to said chair frame for reclining movement between an upright position and a reclined position;

a tilt linkage assembly operably interconnecting said chair frame to said base assembly for providing tilting movement therebetween;

at least one hand brake mechanism supported from a side rail of said base assembly, said hand brake mechanism including an over center linkage assembly selectively positionable between an engaged and a non-engaged position for preventing rotational movement of said rear wheels; and at least one parking brake mechanism supported from a rear cross member of said base assembly, said parking brake mechanism having a spring biased detent mechanism for engaging an aperture formed in at least one of said rear wheels;

whereby said swing link means is positionable into a deep recline position such that said seat back achieves a substantially flat position relative to said seat member.

75. The reclining chair of claim 74 wherein said seat back includes a locking mechanism selectively positionable between an engaged and a non-engaged position for preventing reclining movement of said seat back when said locking mechanism is in the engaged position.

76. The reclining chair of claim 74 further comprising an anti-tip bar assembly for preventing undesired tipping motion of said chair frame and said base assembly.

77. The reclining chair of claim 74 further comprising removable foot rests.

78. The reclining chair of claim 74 further comprising push handles mounted to an upper portion of said seat back, and wherein said push handles are selectively positionable into one of three operative positions.

79. The reclining chair of claim 74 further comprising a pair of arm rests releasably secured to said chair frame.

80. The reclining chair of claim 74 wherein said seat back further includes a slide bracket for engaging an upstanding portion of said swing link, and wherein said seat back is removably secured to said swing link.

81. A reclining chair comprising:

a base assembly having a pair of anti-tip bars slidingly secured to a rear portion thereof;

a pair of front casters and a pair of rear wheels for supporting said base assembly, each having a quick release mechanism for releasably securing said casters and said wheels to said base assembly;

at least one hand brake mechanism supported from a side rail of said base assembly, said hand brake mechanism including an over center linkage assembly selectively positionable between an engaged and a non-engaged position for preventing rotational movement of said rear wheels;

at least one parking brake mechanism supported from a rear cross member of said base assembly, said parking brake mechanism having a spring biased detent mechanism for engaging an aperture formed in at least one of said rear wheels;

a chair frame pivotally supported on said base assembly by a main pivot assembly;

a pair of foot rests supported from said chair frame;

a rotatable drive shaft extending transversely between opposite side portions of said chair frame, said drive shaft being actuated by a handle pivotally coupled to said drive shaft by a chain drive assembly;

a leg rest assembly supported from said chair frame and operatively coupled to said drive shaft for movement from a retracted position to an extended position in response to rotation of said drive shaft in a first direction;

a seat assembly having a seat member, a seat back and a swing link assembly for pivotally interconnecting said seat back and said seat member to said chair frame for reclining movement between an upright position and a reclined position, said swing link assembly being positionable into a deep recline position such that said seat back achieves a substantially flat position relative to said seat member;

said seat back including push handles mounted to an upper portion thereof; and a tilt linkage assembly operably interconnecting said chair frame to said base assembly for providing tilting movement therebetween.

82. The reclining chair of claim 81 wherein said seat back includes a locking mechanism selectively positionable between an engaged and a non-engaged position for preventing reclining movement of said seat back when said locking mechanism is in the engaged position.

83. The reclining chair of claim 81 wherein said push handles are selectively positionable into one of three operative positions.

84. The reclining chair of claim 81 further comprising a pair of arm rests releasably secured to said chair frame.

85. The reclining chair of claim 81 wherein said seat back further includes a slide bracket for engaging an upstanding portion of said swing link assembly, and wherein said seat back is removably secured to said swing link assembly.

86. The reclining chair of claim 81 wherein said tilt linkage assembly further comprises:

a lift link pivotally connected at a first end to said seat member and operably coupled to said base assembly at a second end; and a tilt control lever having a first end pivotally connected to said lift link and a second end operably coupled to said drive shaft for selectively rotating said tilt control lever, said tilt control lever being pivotally supported from said base assembly such that rotation of said tilt control lever urges said lift link upwardly to tilt said chair frame with respect to said base assembly.

* * * * *